(12) United States Patent
Inukai

(10) Patent No.: US 8,253,988 B2
(45) Date of Patent: Aug. 28, 2012

(54) READING METHOD, IMAGE FORMING METHOD, COMPUTER PROGRAM PRODUCT

(75) Inventor: Yoshihiro Inukai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 558 days.

(21) Appl. No.: 12/481,073

(22) Filed: Jun. 9, 2009

(65) Prior Publication Data

US 2009/0316233 A1    Dec. 24, 2009

(30) Foreign Application Priority Data

Jun. 23, 2008 (JP) ................................ 2008-163187

(51) Int. Cl.
*H04N 1/04* (2006.01)

(52) U.S. Cl. ........ 358/474; 358/497; 358/296; 358/498; 399/367

(58) Field of Classification Search ................. 358/474, 358/486, 497, 496, 498, 1.16, 505, 523, 524, 358/404, 412, 413, 420, 422, 426.05, 437, 358/488
See application file for complete search history.

(56) References Cited

U.S. PATENT DOCUMENTS

| | | | |
|---|---|---|---|
| 6,747,765 B2 * | 6/2004 | Kitamura et al. | 358/497 |
| 7,079,182 B1 * | 7/2006 | Yoshikawa et al. | 348/240.3 |
| 7,345,797 B2 * | 3/2008 | Jones | 358/496 |
| 7,551,331 B2 * | 6/2009 | Ishimaru et al. | 358/496 |
| 7,675,653 B2 * | 3/2010 | Jung et al. | 358/468 |
| 2002/0015196 A1 * | 2/2002 | Kitamura et al. | 358/505 |
| 2004/0246538 A1 * | 12/2004 | Jones | 358/486 |
| 2005/0200877 A1 * | 9/2005 | Nitta | 358/1.13 |
| 2006/0290998 A1 * | 12/2006 | Jung et al. | 358/426.03 |
| 2007/0104524 A1 * | 5/2007 | Suzuki | 399/367 |
| 2008/0192301 A1 * | 8/2008 | Ogasahara et al. | 358/401 |

FOREIGN PATENT DOCUMENTS

| | | |
|---|---|---|
| JP | 2001-186311 | 7/2001 |
| JP | 3701621 | 7/2005 |

* cited by examiner

*Primary Examiner* — Negussie Worku

(74) *Attorney, Agent, or Firm* — Oblon, Spivak, McClelland, Maier & Neustadt, L.L.P.

(57) ABSTRACT

An image reading apparatus is configured to stop a scanning unit and a feeding unit when reading is interrupted, move a reading position of the scanning unit from a home position in a sub-scanning direction and stop it, read an original for a predetermined area including an acceleration distance while the reading position of the scanning unit is moved in a direction opposite to the sub-scanning direction, move the reading position of the scanning unit in the sub-scanning direction and return the scanning unit to the home position after the reading is finished, and activate the feeding unit to start reading the original when the reading is restarted.

12 Claims, 21 Drawing Sheets

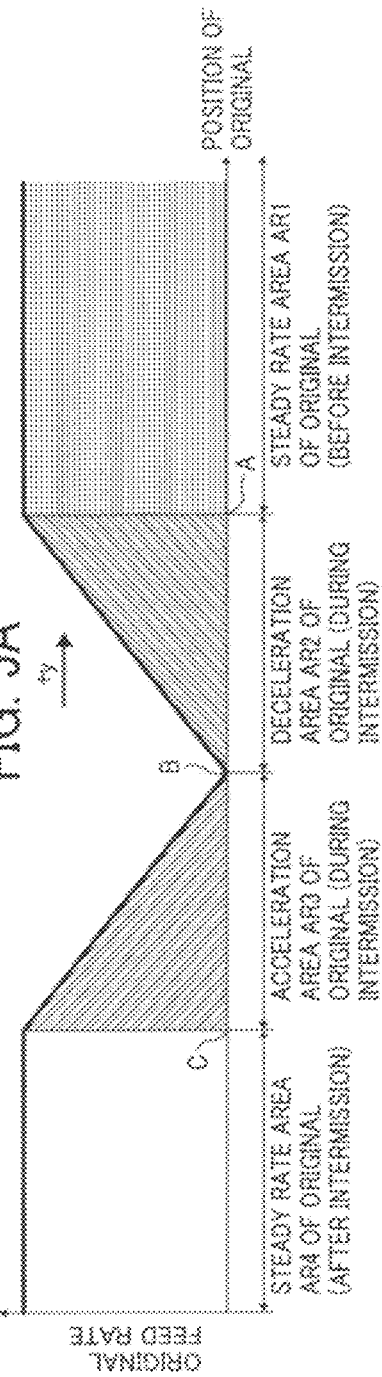
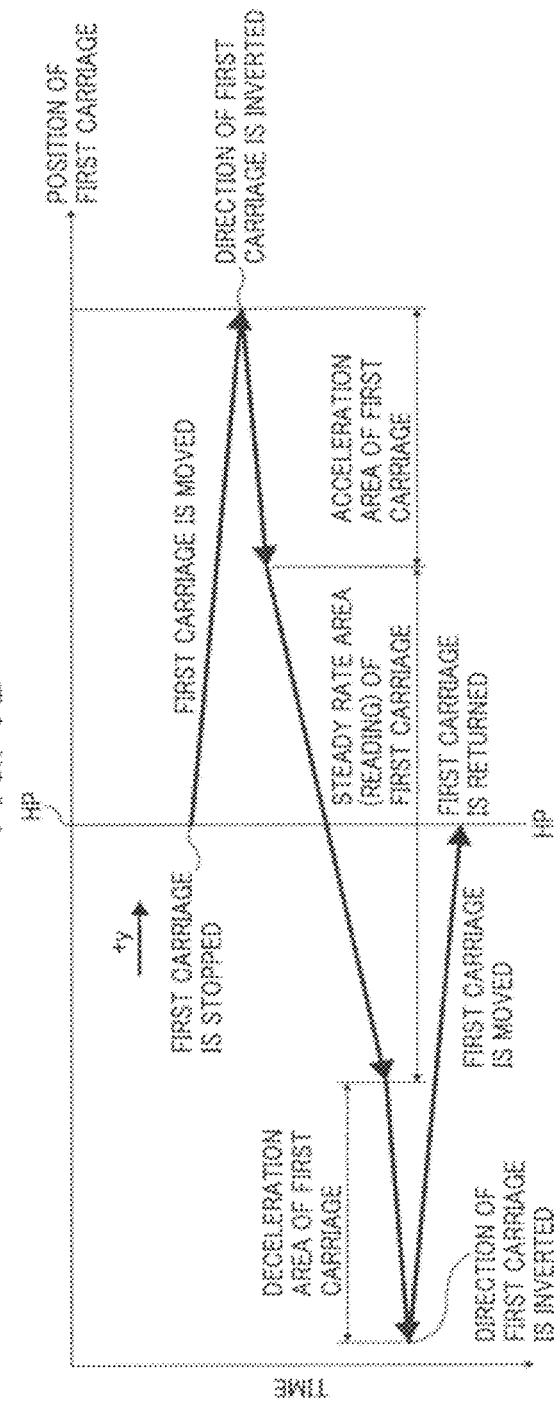

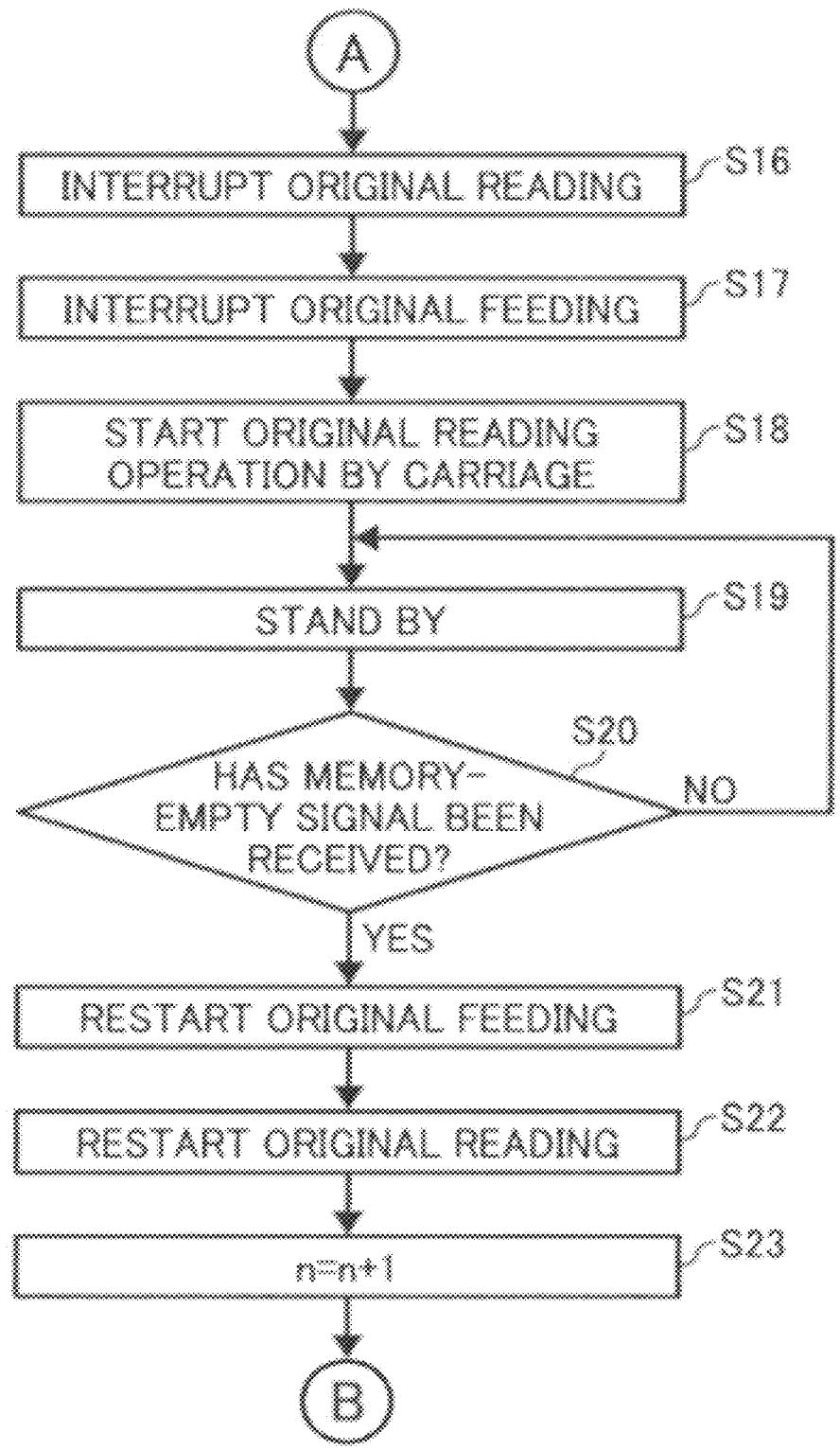

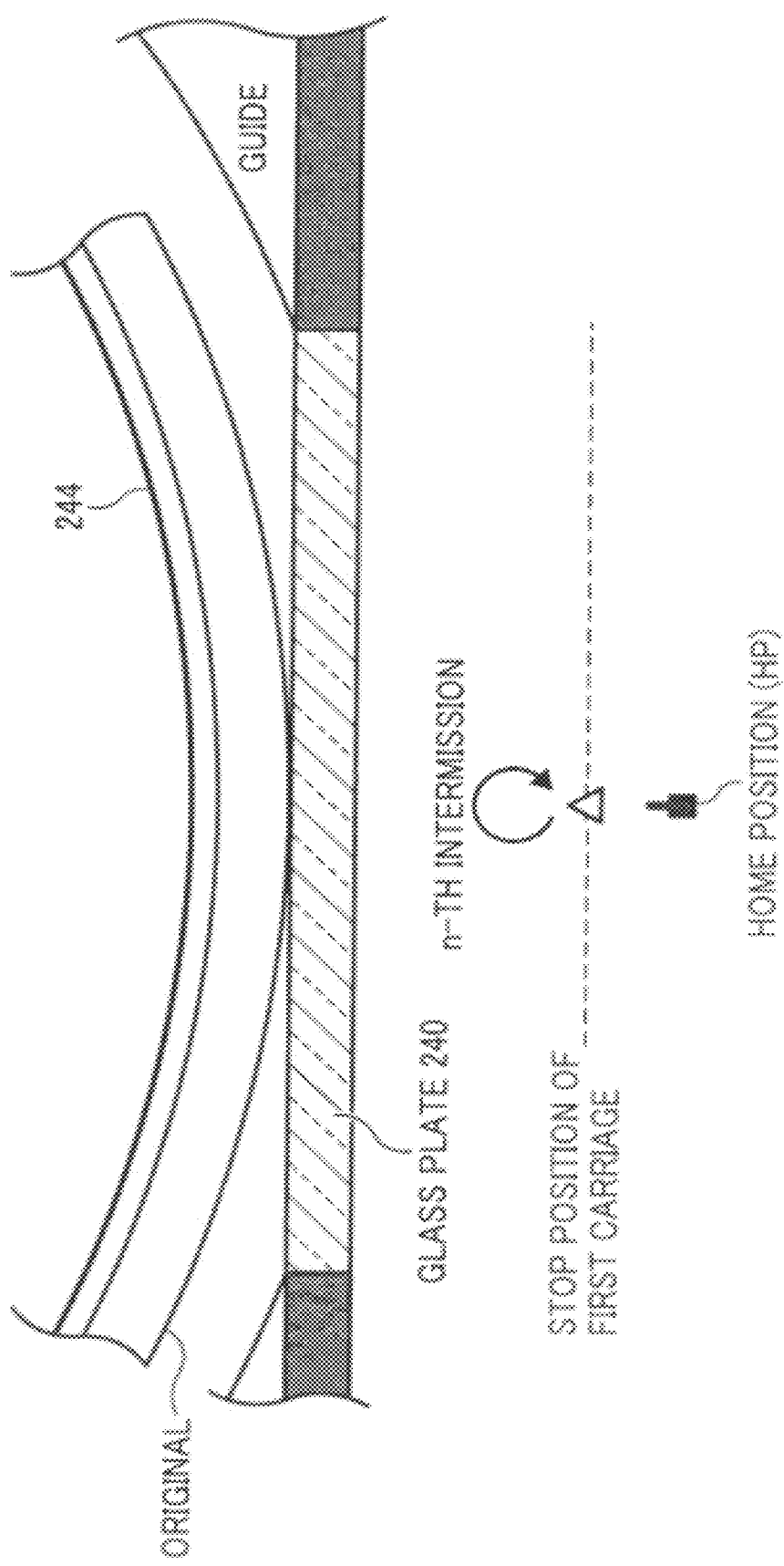

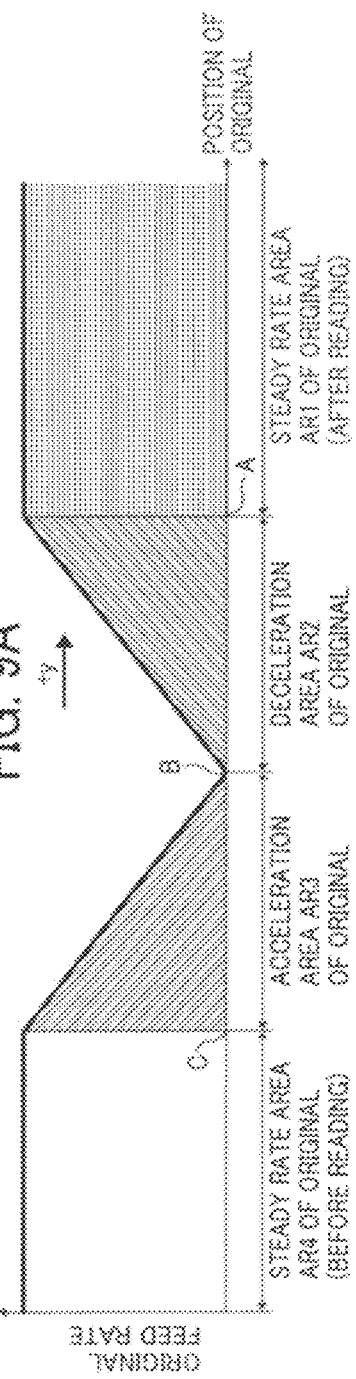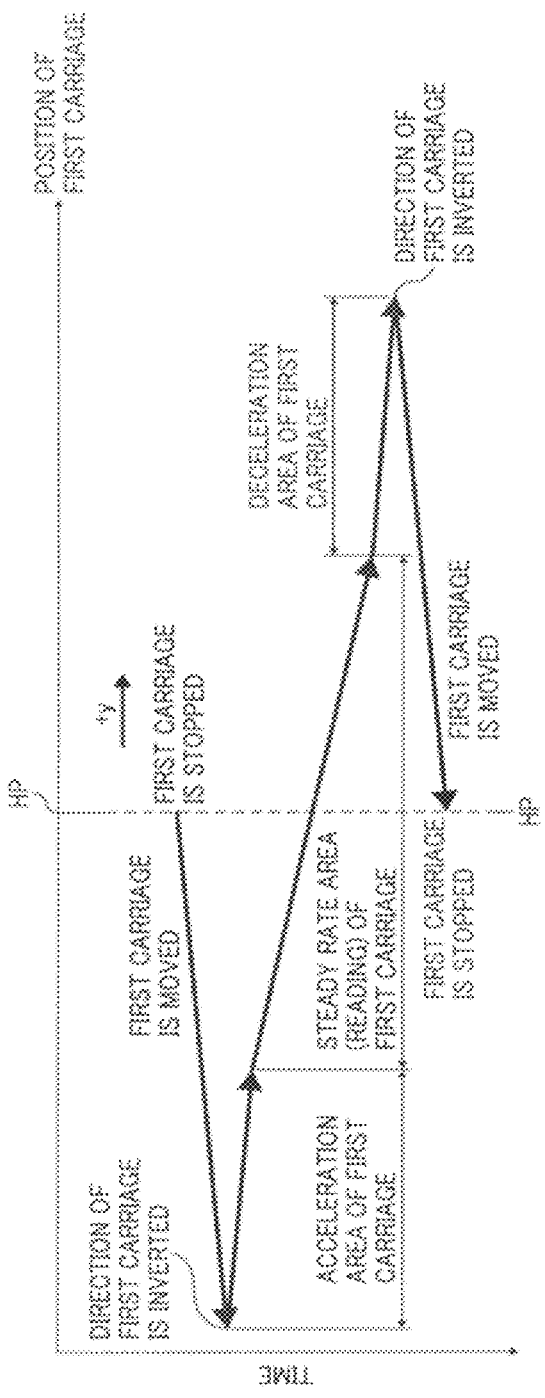

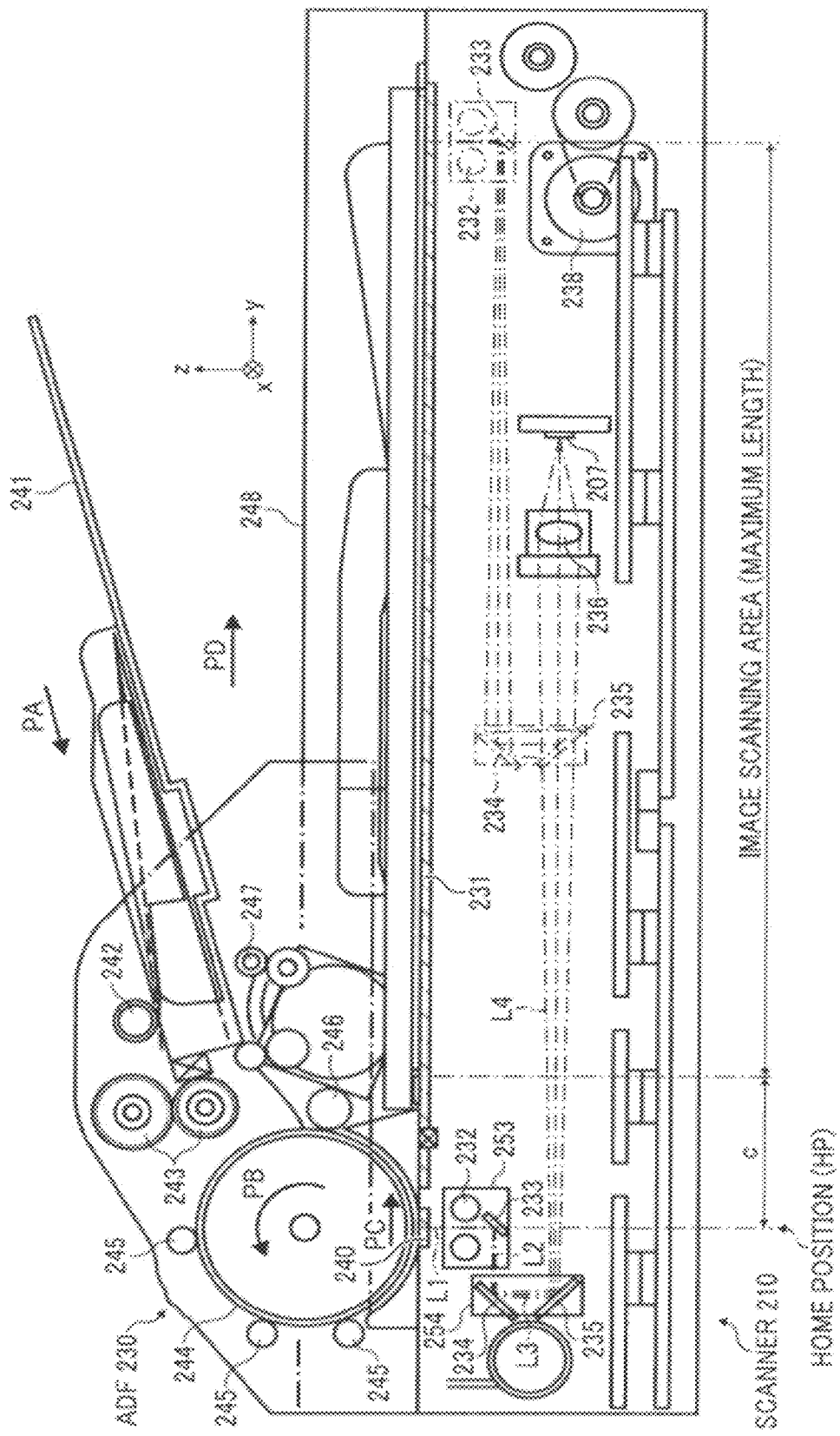

FIG. 13A
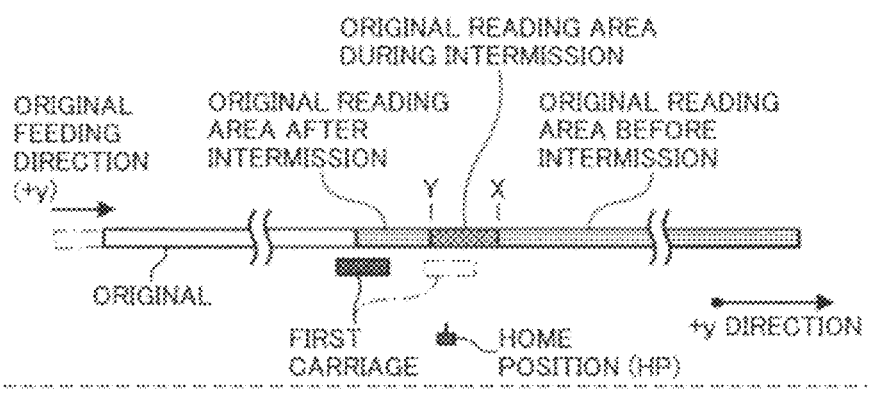
FIG. 13B S54
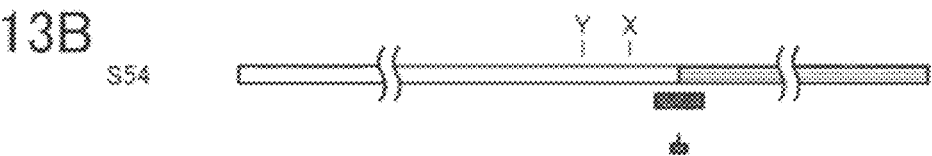
FIG. 13C S55 S56
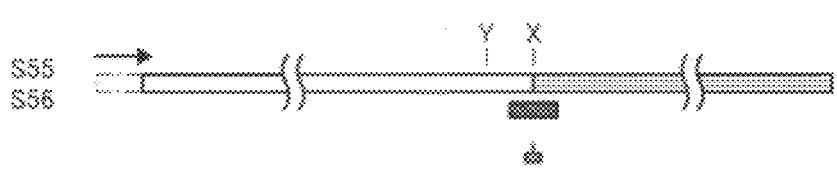

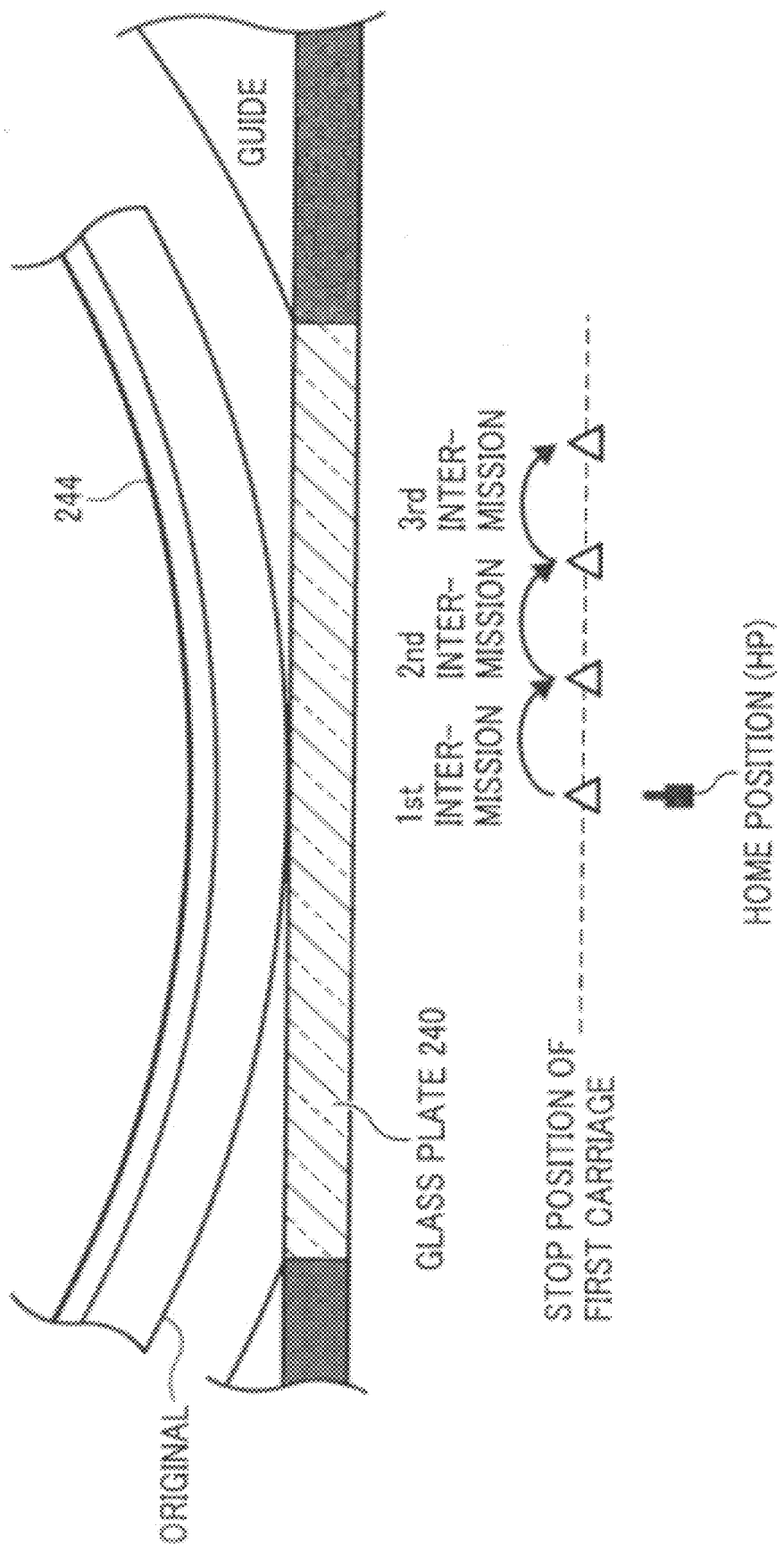

CARRIAGE IS
RETURNED TO
HOME POSITION

ORIGINAL IN
ACCELERATION

ACCELERATION
OF ORIGINAL IS
COMPLETED

ORIGINAL IS IN
CONSTANT-
RATE STATE

READING METHOD, IMAGE FORMING METHOD, COMPUTER PROGRAM PRODUCT

CROSS-REFERENCE TO RELATED APPLICATIONS

The present application claims priority to and incorporates by reference the entire contents of Japanese priority document 2008-163187 filed in Japan on Jun. 23, 2008.

BACKGROUND OF THE INVENTION

1. Field of the Invention

The present invention relates to an image reading apparatus, an image forming apparatus, an image reading method, an image forming method, and a computer program product.

2. Description of the Related Art

Some image reading apparatuses are provided with an auto document feeder (ADF) to feed originals one by one to a scanner unit. FIG. 12 is a schematic diagram of an internal structure of a conventional image reading apparatus provided with an ADF. The conventional image reading apparatus includes a scanner 210, and an ADF 230 located above the scanner 210.

A stack of originals (not shown) is set on an original tray 241 of the ADF 230 and originals picked up one by one by a pickup roller 242. The picked-up original is fed in an arrow PA direction to pass through between a pair of registration rollers 243. The original then passes along a glass plate 240 in an arrow PC direction (which is a sub-scanning direction, a feeding direction, or a plus (+) y direction) by pressing rollers 245 arranged along a feed path of an outer peripheral portion of a feed drum (platen) 244 that is made to rotate in an arrow PB direction and by the feed drum 244. The original is scanned in an x direction (main scanning direction) while it passes along the glass plate 240, and the original is ejected by paper ejection rollers 246 and 247 in an arrow PD direction to be placed on a paper ejection tray 248.

Meanwhile, the scanner 210 includes a contact glass 231, the glass plate 240, a first carriage 253 as a scanning unit, a second carriage 254 as a reflecting unit, a lens 236, a charge-coupled device (CCD) 207, and a carriage motor (stepping motor) 238.

The first carriage 253 includes a lamp (halogen lamp) 232 and a mirror 233 inside thereof. Light emitted from the lamp 232, which lights up only upon reading (scanning) the original, passes through the glass plate 240. The light having passed therethrough is irradiated to one line of the original on the feed drum 244 in the main scanning direction, is reflected by the original, and again passes through the glass plate 240. A position of an optical path L1, where the light reflected from the feed drum 244 passes through the glass plate 240 and enters the mirror 233, is set as a reading position.

The light having passed through the glass plate 240 is bent by mirrors 234 and 235 in the second carriage 254 along U-shape optical paths L2 to L4, is collected by the lens 236 to be photoelectrically converted by the CCD 207, and is output as image data.

The first carriage 253 and the second carriage 254 can move in the +y direction by rotational driving of the carriage motor 238. Positions of the first carriage 253 and the second carriage 254 at home positions (HP) are indicated by solid lines in FIG. 12, and positions of the first carriage 253 and the second carriage 254 at maximum scanning positions are indicated by dashed two-dotted lines therein. When reading the original while it is fed by the feed drum 244, the first carriage 253 is located at the home position (HP). When reading the original not fed thereby but fixed on the contact glass 231, the first carriage 253 moves along an image scanning area (maximum length) by setting a position as another home position that is apart from the home position (HP) by "c" explained later.

When a large number of originals are read using the ADF 230 and if a buffer memory becomes full, for example, this type of image reading apparatus cannot store image data any more. Therefore, even when an original is in the middle of being read, the reading operation of the image data for the original is interrupted (hereinafter, "intermission").

When intermission occurs in the ADF 230, reading by the CCD 207 can be instantly stopped, but the feed drum 244 cannot quickly stop because the feed drum 244 has rotational kinetic energy K ($K=I\omega^2/2$, where I is moment of inertia and $\omega$ is angular velocity), and thus the feed drum 244 is caused to decelerate and then stop. Besides, when the feed drum 244 is again made to rotate, an angular velocity of the feed drum 244 needs to be increased at an angular acceleration $d\omega/dt$ until the angular velocity reaches a feed rate or a feed velocity v ($v=r\omega$, where r is radius of the feed drum 244) being a steady rate because of the moment of inertia I. Therefore, the original is fed in such a manner that the feed rate of the original is decreased from the steady rate (read rate) due to the inertia and then the original stops after a certain time passes since it is decreased and the feed rate of the original is increased from the stopped state to reach the read rate after a certain time passes since it is increased.

Moreover, when the original is read during changing of an original feed rate, this causes an abnormal image data such as its extension, deformation, and displacement. Therefore, the original is not read while the original feed rate is changing caused by occurrence of the intermission, but the original is read instead while the first carriage is moved in the feeding direction during stopping of the original in the intermission. The movement of the first carriage allows the original to be read only when the original feed rate is stable. Thus, a technology of using the above method to prevent occurrence of the abnormal image caused by the intermission is already known.

FIGS. 13A to 13I are diagrams for explaining positional relationships between the original and the first carriage 253 in the image reading apparatus shown in FIG. 12. FIGS. 14A and 14B are flowchart of how the original is read in an ADF mode in the image reading apparatus in FIG. 12.

FIG. 13A is a conceptual diagram of the positional relationship among the original, the carriage, the home position (HP) being a standby position of the carriage, and reading areas. In FIGS. 13B to 13I, X and Y are coordinates indicating marks on the original for convenience in explanation on movement of the original and movement of the carriage. In FIGS. 13A to 13I, a solid black area of the original indicates image reading areas before and after the intermission, a mesh area thereof indicates a reading area when the original is stopped caused by the intermission, and a white area thereof indicates an area of the original before being read. Although the original is bent in an arc while being fed along the feed drum 244, it is shown flat here for convenience in explanation.

In FIG. 13B, the first carriage 253 is located at the home position (HP) in which the reading position is the standby position.

In FIG. 13C, when a buffer memory (not shown) runs out of its free space and a memory-full signal is generated, the reading operation in the CCD 207 is stopped. However, because the feed drum 244 has the moment of inertia, the original cannot stop instantly, i.e., the original comes to a stop after some time. FIG. 13C shows movement of the original in this case, i.e., the original moves from a position indicated by a dotted line to a position indicated by a solid line within this time. An area for a distance from the position of the original indicated by the dotted line to the position indicated by the solid line is already read by the CCD 207 and is thereby included in the solid black area.

In FIG. 13D, assuming that the original is decelerated to a stop in the distance from the position indicated by the dotted line to the position indicated by the solid line in the +y direction, an area for a deceleration distance from a position (X) on the original when the CCD 207 stops an original reading operation to a position (Y) on the original when the original is actually stopped has not been read because the CCD 207 had stopped the original reading operation. Namely, when the original is stopped, the original is located at the position (Y) that is the reading position (home position) of the first carriage 253.

In FIG. 13E, the first carriage 253 reads an area (intermission area) of the original by the CCD 207 in a period from stopping the original after start of its deceleration to accelerating the original upon restart of reading to reach a rate required for the reading. Specifically, the first carriage 253 reads a mesh area of the original by the CCD 207 from the position (Y) to the position (X) while moving from the reading position in the +y direction by a distance X-Y (intermission reading).

In FIG. 13F, when the CCD 207 finishes the reading of the area between the position (Y) and the position (X) on the original, the first carriage 253 is stopped to enter a standby state.

In FIG. 13G, when the cause of the interruption in the reading of the original is resolved (e.g., when the free space of the memory for storing therein image data is sufficiently freed up), the reading of the original is restarted.

When the reading of the original is restarted, feeding of the original is started from the position indicated by the dotted line. Even if the feeding of the original is started, it takes time until its rate reaches the rate required for reading. However, the reading of the area between the position (X) and the position (Y) is already finished.

In FIG. 13H, because the original is being accelerated in the area from the position indicated by the dotted line to the position indicated by the solid line, the CCD 207 is in a standby state without performing the reading operation.

In FIG. 13I, when the feed rate of the original reaches a rate required to read the original, the CCD 207 restarts the original reading operation and reads an area from the position (Y) of the original indicated as the solid black area.

The reciprocating movement of the first carriage 253 as shown in FIGS. 13A to 13I is further explained with reference to the flowcharts in FIGS. 14A and 14B.

As shown in FIG. 14A, first, the ADF mode is set (Step S51), then the feed drum 244 is made to rotate and starts feeding the original (Step S52), and an image reading operation is started by an instruction of a central processing unit (CPU) 261 as a control unit (Step S53). When the image reading operation is started, the number of times of original reading is set to an n-th time (in this case, n is 1) (Step S54).

When the ADF 230 is reading the original, the CPU 261 determines whether a memory-full signal has been received (Step S55). Specifically, generation of the memory-full signal is the cause of the interruption in the reading operation, and is a signal, instructed by an image-storage controller 273, indicating reduction in the free space of the buffer memory.

When having received the memory-full signal (Yes at Step S55), the ADF 230 interrupts the reading operation at this point in time (Step S56) (see FIG. 14B).

The original is decelerated and comes to a stop (Step S57).

Next, the CCD 207 reads the original by the instruction of the CPU 261 while the first carriage 253 moves from the position where the original is decelerated to a stop to the position where the CCD 207 stops the original reading operation (Step S58).

The first carriage 253 reaches the position (X) of the original and stands by thereat (Step S59) by the instruction of the CPU 261, and the CPU 261 determines whether a memory-empty signal has been received (Step S60). At this time, the first carriage 253 is located at the position (X) where the CCD 207 stops the original reading operation.

When the factor to interrupt the reading of the original is resolved (when the memory space that stores image data is sufficiently freed up), the image-storage controller 273 issues the memory-empty signal. When having received the memory-empty signal (Yes at Step S60), the CPU 261 restarts the original feeding (Step S61).

When the original feeding is restarted, the CCD 207 restarts reading the original upon reaching the read rate of the original, and reads the area which has not been read.

At this time, "n" at Step S63 becomes 2 (2 is obtained by substituting 1 for n of "n+1" in the right-hand side), and process returns to Step S54.

Thereafter, it is determined at Step S55 whether the memory-full signal has been received.

It is noted that when the image reading apparatus does not receive the memory-full signal and finishes the reading operation of a sheet of original (normal reading), the number n of times of the original reading is 1. When the image reading apparatus receives the memory-full signal, temporarily interrupts the reading operation of a sheet of original, and restarts it (intermission reading), then the number n of times of the original reading becomes at least 2.

When the memory-full signal has not been received (No at Step S55), the CPU 261 determines whether the original has been read to a trailing edge thereof (Step S64). When the original has not been read to the trailing edge (No at Step S64), process returns to Step S54, while when the original has been read to the trailing edge (Yes at Step S64), the CPU 261 ends the image reading (Step S65), ejects the original from the ADF 230, and ends the process (Step S66).

FIG. 15 is a schematic for explaining a positional relationship between the feed drum 244 and the first carriage 253 of the image reading apparatus shown in FIG. 12.

According to the image reading method as shown in FIGS. 13A to 13I and FIG. 14, when the CPU 261 does not receive the memory-full signal from the image-storage controller 273 during the original reading operation, the first carriage 253 stands by at the home position (HP) (number n of times of the original reading: n=1).

However, when the CPU 261 receives the memory-full signal from the image-storage controller 273 during the original reading operation and interrupts the original reading, the first carriage 253 moves in the +y direction by an area of a first intermission (which corresponds to the area between the position (X) and the position (Y) in FIG. 13A), and enters standby.

When the CPU 261 receives again the memory-full signal therefrom during the reading operation of a next original and interrupts the original reading, the first carriage 253 moves up to a position of a second intermission from the position of the first intermission in the +y direction, and enters standby.

When the CPU 261 receives again the memory-full signal therefrom during the reading operation of a further next original and interrupts the original reading, the first carriage 253 moves up to a position of a third intermission from the position of the second intermission in the +y direction, and enters standby.

Thereafter, when the CPU 261 receives again the memory-full signal during the reading operation of an original and interrupts the original reading, the first carriage 253 moves by a distance for one intermission in the +y direction, and eventually, the first carriage 253 is off the glass plate 240 which is a readable area, so that the original cannot be read.

A factor by which the original cannot be read is because the first carriage 253 is caused to move in the feeding direction (+y direction) each time the intermission occurs and then stand by at the position as it is, as shown in FIGS. 13B to 13I and Steps S54 to S63 in FIG. 14.

Therefore, to solve the problem on displacement of the first carriage 253 from the glass plate 240, a technology as follows has been proposed. That is, as shown in FIGS. 16A to 16I, the reading operation is performed while the first carriage 253 is moved in the feeding direction, and then, the first carriage 253 is returned to the home position (HP).

FIGS. 16A to 16I are diagrams for explaining a relationship between the original and the first carriage in the image reading apparatus according to the present invention.

FIGS. 16A to 16E are the same as FIGS. 13B to 13F, and therefore explanation thereof is omitted hereinafter.

In FIG. 16F, the first carriage 253 is returned to the home position (HP).

In FIG. 16G, when the feeding of the original is restarted, the original is accelerated to a rate required for reading.

In FIG. 16H, the acceleration of the original is completed.

In FIG. 16I, the original enters a constant-rate state, and the CCD 207 restarts to read the original.

As explained above, in the technology using the method of returning the first carriage 253 to the home position (HP) as shown in FIGS. 16A to 16I, if the CCD 207 reads the original in the area where the original is being accelerated, the image data is deformed, and thus, the reading operation is stopped in this area. Therefore, the image data near an intermission portion is scanned only from the deceleration area (intermission reading), which causes the image data to become discontinuous.

Meanwhile, Japanese Patent No. 3701621 discloses another conventional technology. The disclosed technology is achieved to prevent occurrence of an abnormal image caused by intermission of an ADF by not reading an original during deceleration or acceleration of the original, but by reading image data, instead, simultaneously when a carriage is moved during stop of the original due to the intermission of the ADF, and by putting image data before and after the intermission together with image data during the intermission, so that the original is read only when the feed rate of the original is stable. The disclosed technology, however, has a problem that repetition of intermission causes the carriage to move, to be off from a glass plate which is a readable area, and to become incapable of reading the original.

SUMMARY OF THE INVENTION

It is an object of the present invention to at least partially solve the problems in the conventional technology.

According to an aspect of the present invention, there is provided an image reading apparatus including a scanning unit that scans one line of an original in a main scanning direction to collect a reflected light; a photoelectric converter that converts the reflected light collected at the scanning unit to image data; a storage unit that temporarily stores therein the image data; an original moving unit that moves the original at a predetermined rate in a sub-scanning direction perpendicular to the main scanning direction; a scanner moving unit that moves the scanning unit in parallel to the sub-scanning direction; and a control unit that controls operations of the scanning unit, the photoelectric converter, the storage unit, the original moving unit, and the scanner moving unit. The control unit, when scanning of the original is to be interrupted because of running out memory space for image data in the storage unit, controls the original moving unit to decelerate the original and then stop the original, the scanner moving unit to move the scanning unit by a sum of a distance from decelerating the original to stopping from a standby position in the sub-scanning direction and an acceleration distance in which the original is accelerated to a read rate, and then controls the scanning unit to scan the original while the scanner moving unit is moving the scanning unit in a direction opposite to the sub-scanning direction at a rate required for reading, and the scanner moving unit to return the scanning unit to the standby position after scanning of the original is finished. The control unit, when scanning of the original is to be restarted when memory space for image data becomes available in the storage unit, controls the original moving unit to accelerate the original to the rate required for reading and controls the scanner moving unit to move the scanning unit to scan the original.

According to another aspect of the present invention, there is provided an image forming apparatus that uses the above image reading apparatus.

According to still another aspect of the present invention, there is provided an image reading method including scanning one line of an original in a main scanning direction by a scanning unit to collect a reflected light; converting the reflected light to image data by a photoelectric converter; temporarily storing the image data in a storage unit; moving the original at a predetermined rate in a sub-scanning direction perpendicular to the main scanning direction by an original moving unit; moving the scanning unit in parallel to the sub-scanning direction by a scanner moving unit; and controlling operations of the scanning unit, the photoelectric converter, the storage unit, the original moving unit, and the scanner moving unit. The controlling includes, when scanning of the original is to be interrupted because of running out memory space for image data in the storage unit, controlling the original moving unit to decelerate the original and then stop the original, the scanner moving unit to move the scanning unit by a sum of a distance from decelerating the original to stopping from a standby position in the sub-scanning direction and an acceleration distance in which the original is accelerated to a read rate, and then controlling the scanning unit to scan the original while the scanner moving unit is moving the scanning unit in a direction opposite to the sub-scanning direction at a rate required for reading, and the scanner moving unit to return the scanning unit to the standby position after scanning of the original is finished. The controlling includes, when scanning of the original is to be restarted when memory space for image data becomes available in the storage unit, controlling the original moving unit to accelerate the original to the rate required for reading and controls the scanner moving unit to move the scanning unit to scan the original.

According to still another aspect of the present invention, there is provided an image forming method that uses the above image reading method.

According to still another aspect of the present invention, there is provided a computer program product that includes a computer program stored on a computer-readable recording medium, the computer program when executed on a computer causes the computer to execute scanning one line of an original in a main scanning direction by a scanning unit to collect a reflected light; converting the reflected light to image data by a photoelectric converter; temporarily storing the image data in a storage unit; moving the original at a predetermined rate in a sub-scanning direction perpendicular to the main scanning direction by an original moving unit; moving the scanning unit in parallel to the sub-scanning direction by a scanner moving unit; and controlling operations of the scanning unit, the photoelectric converter, the storage unit, the original moving unit, and the scanner moving unit. The controlling includes, when scanning of the original is to be interrupted because of running out memory space for image data in the storage unit, controlling the original moving unit to decelerate the original and then stop the original, the scanner moving unit to move the scanning unit by a sum of a distance from decelerating the original to stopping from a standby position in the sub-scanning direction and an acceleration distance in which the original is accelerated to a read rate, and then controlling the scanning unit to scan the original while the scanner moving unit is moving the scanning unit in a direction opposite to the sub-scanning direction at a rate required for reading, and the scanner moving unit to return the scanning unit to the standby position after scanning of the original is finished. The controlling includes, when scanning of the original is to be restarted when memory space for image data becomes available in the storage unit, controlling the original moving unit to accelerate the original to the rate required for reading and controls the scanner moving unit to move the scanning unit to scan the original.

According to still another aspect of the present invention, there is provided an image forming method that uses the above computer program product.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A is a diagram for explaining a relationship between a feed rate and a position of an original when a reading operation is interrupted during the original reading operation and when the reading operation is restarted in the image reading apparatus shown in FIG. 2;

FIG. 5B is a diagram for explaining how the first carriage moves when the reading operation is interrupted during the original reading operation and when the reading operation is restarted in the image reading apparatus shown in FIG. 2;

FIGS. 7A and 7B are flowcharts of the whole of an image reading method according to the first embodiment;

FIG. 8 is a schematic for explaining a positional relationship between a feed drum and the first carriage of the image reading apparatus shown in FIG. 2;

FIG. 9A is a diagram for explaining a relationship between a feed rate and a position of the original when the reading operation is interrupted during the original reading operation and the reading operation is restarted in the image reading apparatus shown in FIG. 2;

FIG. 9B is a diagram for explaining how the first carriage moves when the reading operation is interrupted during the original reading operation and the reading operation is restarted in the image reading apparatus shown in FIG. 2;

FIG. 12 is a cross section of an image reading apparatus including ADF according to a conventional technology;

FIGS. 13A to 13I are diagrams for explaining a positional relationship between the original and the first carriage in the image reading apparatus shown in FIG. 12;

FIG. 15 is a schematic for explaining a positional relationship between the feed drum and the first carriage of the image reading apparatus shown in FIG. 12.

DETAILED DESCRIPTION OF THE PREFERRED EMBODIMENTS

Exemplary embodiments of an image reading apparatus are explained in detail below with reference to the accompanying drawings.

Figure 2:
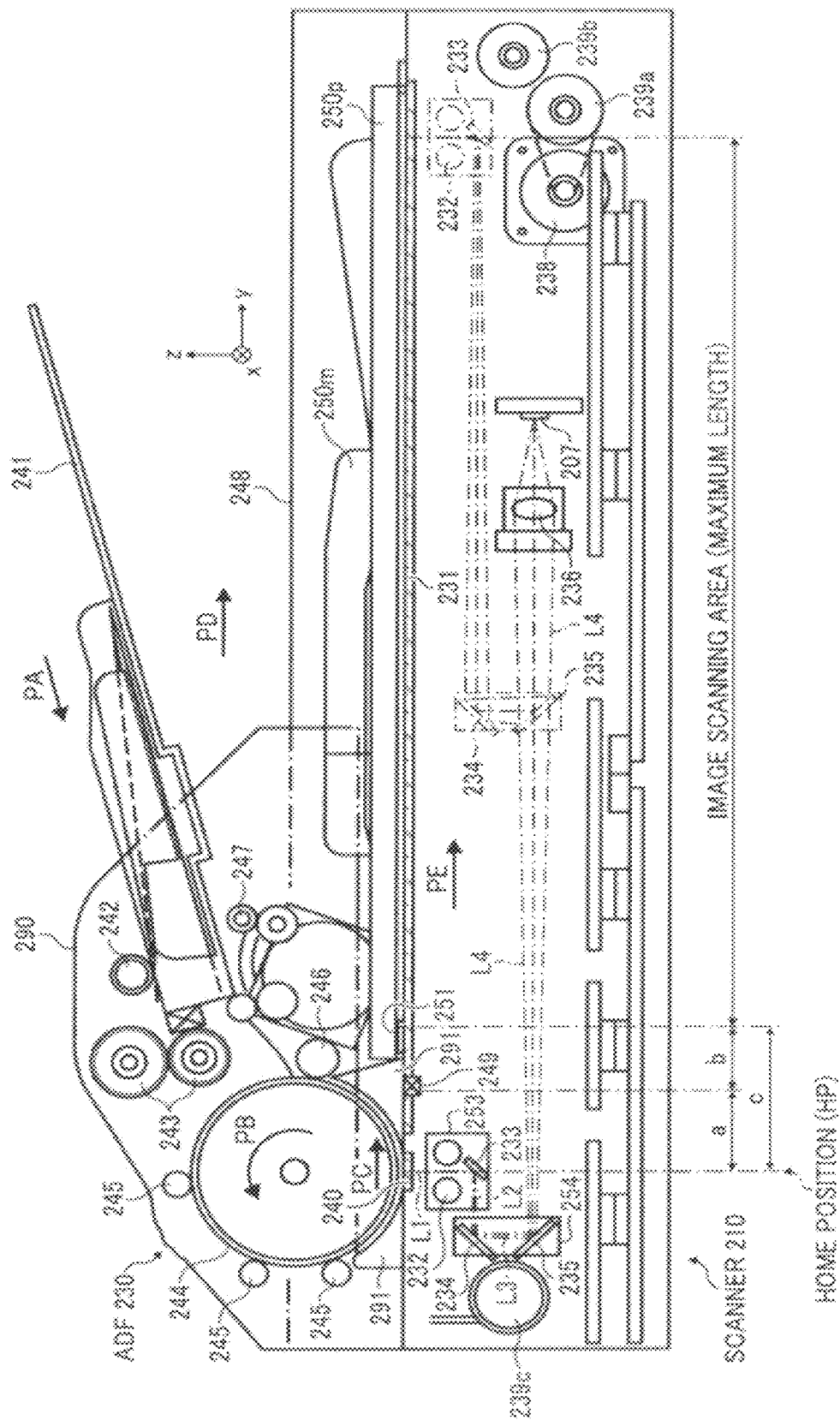
FIG. 2 is a schematic diagram of an internal structure of an image reading apparatus according to a first embodiment of the present invention.

FIG. 2 is a cross section of an image reading apparatus according to a first embodiment of the present invention.

Similarly to the image reading apparatus shown in FIG. 12, the image reading apparatus shown in FIG. 2 includes the scanner 210 and the ADF 230 located above the scanner 210. It is noted that common reference numerals are used for components the same as these of the image reading apparatus in FIG. 12.

The ADF 230 as a feeding unit includes the original tray 241 that is inclined toward the ADF 230 so that an original is set thereon and is easily fed into the unit. Arranged near the lower end of the original tray 241 is the pickup roller 242 that is provided inside the ADF 230 and picks up originals in the original tray 241 one by one from an outermost layer thereof. The pickup roller 242 picks up each original in such a manner that a rubber roller that is caused to rotate in, for example, a clockwise in FIG. 2 comes in close contact with the original and rotates.

Arranged in the downstream side (left-hand side in FIG. 2) of the pickup roller 242 are the registration rollers 243 that feed the picked-up original to the feed drum 244. Arranged in the downstream side of the registration rollers 243 is the feed drum 244 used to feed the original fed by the registration rollers 243 so as to pass the original along the lamp 232 side of the first carriage 253. The feed drum 244 is covered with a cover 290. The cover 290 has a nearly semicircular cross-sectional concave surface inside the feed drum 244 through a space which allows the original to pass therethrough. Arranged between the lower side of the feed drum 244 and the scanner 210 is a pair of guides 291 that has a nearly semicircular cross-sectional concave surface through a space which allows the original to pass therethrough. Arranged in the cover 290 are the pressing rollers 245 (although three rollers are shown in FIG. 2, the number is not limited thereto) to press the original fed from the registration rollers 243 against the feed drum 244.

The pair of guides 291 arranged under the feed drum 244 has a fixed space therebetween so that the glass plate 240 for reading the original is exposed. Arranged in the downstream side of the guides 291 arranged in the downstream side (right-hand side in FIG. 2) are the paper ejection rollers 246 and 247 (although two rollers are shown in FIG. 2, the number is not limited thereto) to eject the original having been read while having passed through between the feed drum 244 and the glass plate 240. Arranged in the downstream side of the paper ejection rollers 246 and 247 is the paper ejection tray 248 that stores thereon read originals.

It is noted that the surface of the feed drum 244 is white in color so as to function as a white reference surface used to read the original.

A pressure plate 250*p* is provided under the paper ejection tray 248, and a handle 250*m* is formed on the pressure plate 250*p*.

The ADF 230 with the paper ejection tray 248 is hinged (not shown) with the scanner 210, so that a user holds the handle 250*m* to pull up both the pressure plate 250*p* and the ADF 230 from the scanner 210, and thus the ADF 230 can be raised or opened. By putting down or closing the pressure plate 250*p*, the original set on the contact glass 231 that is a fixed original setting portion of the scanner 210 is uniformly pressed against the contact glass 231.

A stack of originals (not shown) is set on the original tray 241 and originals are fed one by one by the pickup roller 242 toward the left-hand side in FIG. 2 in the arrow PA direction. The original first passes through the registration rollers 243, and then passes along the glass plate 240 in the arrow PC direction (feeding direction) by the pressing rollers 245 and the feed drum 244 which are arranged along the feed path of the outer peripheral portion of the feed drum 244 that is made to rotate in the arrow PB direction. The original is finally ejected by the paper ejection rollers 246 and 247 in the arrow PD direction to be placed on the paper ejection tray 248.

Meanwhile, the scanner 210 includes the glass plate 240 placed right under the feed drum 244 to read the original fed by the ADF 230 from the original tray 241, and the contact glass 231 used to read the original pressed against the contact glass 231 by the pressure plate 250*p*.

A scale 251 for positioning of a leading edge of the original is provided between the glass plate 240 and the contact glass 231. A reference white plate (not shown) and a base point sensor 249 that detects the first carriage (simply "carriage" in some figures) 253 as a scanning unit are arranged between the scale 251 and the glass plate 240.

The reference white plate is used to correct (shading correction) a phenomenon that image data varies caused by fluctuations in a main scanning direction and non-uniform sensitivity for each pixel of the CCD 207, even though the original with uniform density is read.

The first carriage 253 includes a housing, a lamp (although two lamps are shown in FIG. 2, the number thereof may be one) 232 that is placed in the housing and irradiates one line of the original in the main scanning direction (x direction in FIG. 2), and also includes the mirror 233 that is placed in the housing and orthogonally reflects an incident-reflected light from the original in a direction opposite to the y direction.

The second carriage 254 as a reflecting unit is placed on the optical path of the reflected light of the mirror 233 in the first carriage 253.

The second carriage 254 includes a housing and the mirrors 234 and 235 as a pair that are vertically arranged within the housing and bend the incident-reflected light from the first carriage 253 in the U-shape.

The lens 236 for collecting the reflected light is placed on the optical path of the reflected light from the second carriage 254, and the CCD 207 that converts the collected light to an electrical signal is placed at a focus position of the lens 236.

A pair of parallel rails (not shown) are arranged inside a housing of the scanner 210 in the +y direction, so that the first carriage 253 including the lamp (although two lamps are provided in FIG. 2, the number thereof may be one) 232 and the mirror 233 can be moved along the rails. A length of the rails has to be a length so that an optical axis (reading position) of light emitted from the first carriage 253 and reflected by the original can be moved from an outside of the glass plate 240 to an outside of the contact glass 231.

Arranged at both ends of the rails (not shown) are drive pulleys 239*a*, pulleys 239*b*, and idle pulleys 239*c*. A wrapping-connector transmission device includes a belt (wire or chain) (not shown), and the drive pulleys 239*a*, the pulleys 239*b*, and the idle pulleys 239*c*. The wrapping-connector transmission device is configured to move the second carriage 254 simultaneously with the first carriage 253 by a length of nearly a half of a moving distance of the first carriage 253. The drive pulleys 239*a* are driven to rotate by the carriage motor 238.

The first carriage 253 and the second carriage 254 can be moved from positions indicated by the solid line to positions indicated by the dashed two-dotted line, respectively.

When the original is fed by the feed drum 244 to be read, the first carriage 253 stands by at the home position (HP) being the reading position. When the original is set on the contact glass 231 to be read, the first carriage 253 stands by at a location away from the home position (HP) by a distance "c" that is a distance from the home position to the scale for positioning. It is noted that in FIG. 2, letter "a" represents a distance from the home position to the base point sensor 249, and letter "b" represents a distance obtained by subtracting the distance "a" from the distance "c".

Figure 3:
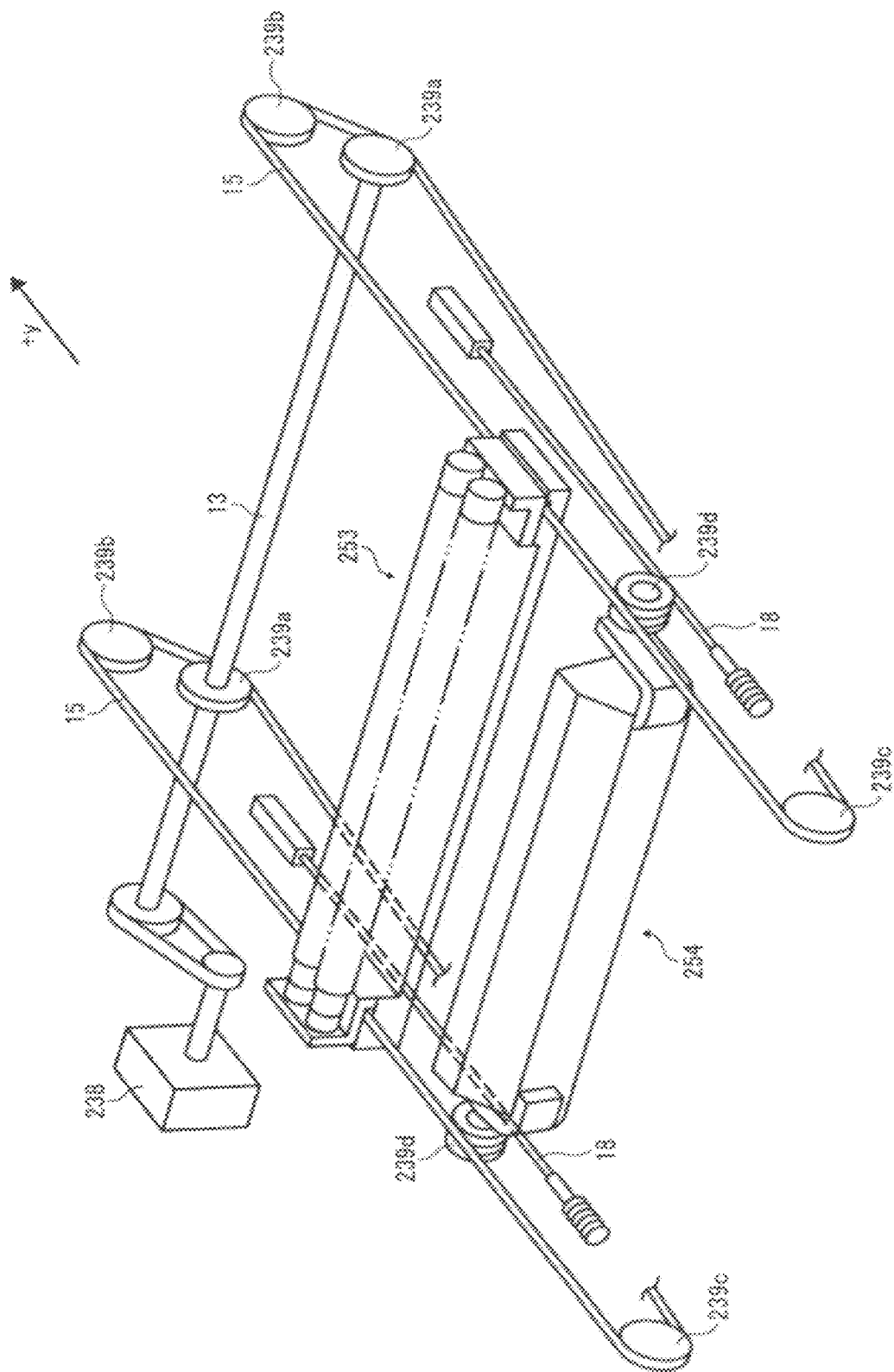
FIG. 3 is a perspective view of a drive unit for a first carriage and a second carriage in the image reading apparatus in FIG. 2.

A photoelectric converter is formed with the lens 236 and the CCD 207, and a moving unit is formed with the carriage motor 238, the first carriage 253, the second carriage 254, the drive pulleys 239*a*, the pulleys 239*b*, the idle pulleys 239*c*, and moving pulleys 239*d* (see FIG. 3).

The feeding unit (ADF) is formed with the original tray 241, the pickup roller 242, the registration rollers 243, the feed drum 244, the pressing rollers 245, the paper ejection rollers 246 and 247, and the paper ejection tray 248.

FIG. 3 is a perspective view of the drive unit for the first carriage and the second carriage in the image reading apparatus in FIG. 2.

In FIG. 3, reference numeral 13 represents a drive shaft and 15 represents a wire, and the moving pulleys 239*d* are pulleys rotatably provided at both ends of the second carriage 254. The wire 15 is wrapped so as to partially contact each outer periphery of the drive pulleys 239*a*, the pulleys 239*b*, and the idle pulleys 239*c*, and to entirely contact each outer periphery of the moving pulleys 239*d*, and is also fixed to the first carriage 253.

The first carriage 253 and the second carriage 254 are reciprocally driven in a direction parallel to the +y direction by winding and unwinding the wire 15 by the carriage motor 238, the wire 15 being wrapped around the drive pulleys 239a, the pulleys 239b, the idle pulleys 239c, and the moving pulleys 239d. Furthermore, the carriages 253 and 254 move along a pair of guide rails 18 provided in the sub-scanning direction. An outer diameter of the moving pulley 239d is set so that the second carriage 254 can be moved at a speed of nearly a half of the first carriage 253.

Figure 4:
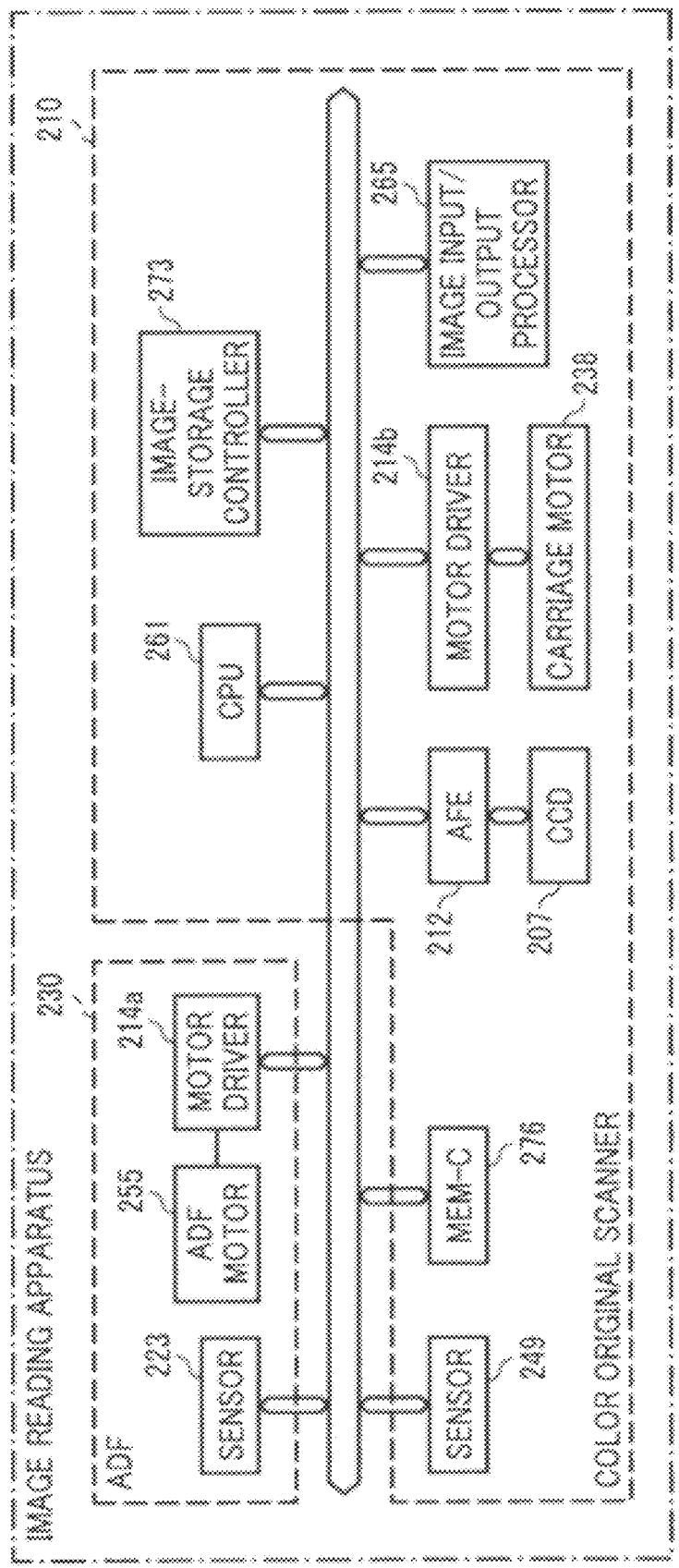
FIG. 4 is a block diagram of the image reading apparatus in FIG. 2.

FIG. 4 is a block diagram of the image reading apparatus shown in FIG. 2.

Mounted on a sensor board unit SBU (not shown) in the scanner (color original scanner) 210 are the CPU 261, a read only memory (ROM) (not shown), and a random access memory (RAM) (not shown). The CPU 261 writes a computer program stored in the ROM to the RAM and executes the computer program, and thereby controls the entire scanner 210.

The scanner 210 is connected to the CPU 261 for process control, explained later, through a communication line, and performs an operation instructed by transmitting and receiving a command or image data. The CPU 261 in the scanner 210 receives signals from the base point sensor 249, and an original detection sensor, a home position sensor, a pressure-plate opening/closing sensor, and a cooling fan or the like which are not shown, and controls on/off thereof. In the scanner 210, a motor driver 214b is driven by a pulse-width modulation (PWM) output from the CPU 261 to generate an excitation-pulse sequence signal, and the carriage motor 238 is thereby driven to rotate.

The original is illuminated by the lamp 232 that is electrically connected by a lamp regulator (not shown), and an optical signal being light reflected from the original passes through the mirrors 233 to 235 and the lens 236 to form an image on the CCD 207 including three line sensors for reading red (R), green (G), and blue (B) (see FIG. 2). The CCD 207 outputs an analog image signal for each pixel of RGB given each drive clock by the CPU 261 on the sensor board unit SBU to an analog front end (AFE) 212 that performs analog signal processing and analog-to-digital (A-D) conversion.

Generation of the motor drive pulse and detection of the position of the carriage or the original is performed as follows:

The image reading apparatus includes the ADF 230 and the color original scanner or the scanner 210.

The ADF 230 includes an ADF motor 255, a motor driver 214a, and a sensor 223.

The scanner 210 includes the CCD 207, the motor driver 214b, the carriage motor 238, the base point sensor (hereinafter, "sensor") 249, and an image input/output processor 265 including an application specific integrated circuit (ASIC).

The CPU 261 integrally controls the image reading apparatus, and outputs PWM pulses to the motor drivers 214a and 214b. The motor drivers 214a and 214b generate excitation-pulse sequence signals driven by the PWM outputs, to drive the carriage motor 238 and the ADF motor 255.

The CPU 261 counts the number of generated PWM pulses, to detect a position of the first carriage 253 (and second carriage 254) moving by the carriage motor 238, or detects a position of the original moving by the ADF motor 255.

The image-storage controller 273 outputs a memory-full signal to the CPU 261 when the free space of a local memory MEM-C 276, being a storage unit that stores image data, runs low. The image-storage controller 273 outputs a memory-empty signal to the CPU 261 when the free space of the local memory MEM-C 276 is sufficiently freed up.

When receiving the memory-full signal from the image-storage controller 273, the CPU 261 outputs a PWM pulse to control the ADF motor 255 so as to decrease a feed rate of the original or a rotational speed (angular velocity) of the feed drum 244 to a stop. The PWM pulse causes the motor driver 214a to generate an excitation-pulse sequence signal. When receiving the memory-empty signal from the image-storage controller 273, the CPU 261 outputs a PWM pulse to control the ADF motor 255 so as to increase the feed rate of the original from zero to return the feed rate to the rate before the intermission had occurred. The PWM pulse causes the motor driver 214a to generate an excitation-pulse sequence signal. To move the first carriage 253 (and the second carriage 254) when the original is stopped due to the intermission of the ADF, the CPU 261 further outputs a PWM pulse for controlling the carriage motor.

When receiving the memory-full signal from the image-storage controller 273, the CPU 261 outputs a read interrupt signal to the image input/output processor 265. When the memory-empty signal is received from the image-storage controller 273 and then the original is fed to a predetermined position, the CPU 261 outputs a read restart signal to the image input/output processor 265 (details of the signals are explained later with reference to FIGS. 6A to 6N).

Furthermore, when detecting that the first carriage 253 is carried to the predetermined position when original feeding is stopped due to the intermission of the ADF 230, the CPU 261 outputs a read restart signal or a read stop signal to the image input/output processor 265.

When receiving the read interrupt signal (or the read restart signal), the image input/output processor 265 interrupts (or restarts) scanning the image data for the original output from the AFE 212.

Next, the operation of the image reading apparatus shown in FIG. 2 is explained with reference to FIGS. 5A and 5B.

FIG. 5A is a diagram for explaining a relationship between a feed rate and a position of an original when the reading operation is interrupted during the original reading operation and when it is restarted in the image reading apparatus shown in FIG. 2. In FIG. 5A, the horizontal-axis represents a position of the original with respect to the home position (HP), and the vertical-axis represents an original feed rate.

FIG. 5B is a diagram for explaining how the first carriage moves when the reading operation is interrupted during the original reading operation and when it is restarted in the image reading apparatus shown in FIG. 2. In FIG. 5B, the horizontal-axis represents a position of the first carriage, and the vertical-axis represents time.

When the original is fed at a fixed rate required for reading and is read (steady rate area AR1: FIG. 5A), the first carriage 253 (see FIG. 2) is stopped at the home position (HP) (FIG. 5B).

When the original reading operation is interrupted, the feed rate of the original is decreased to a stop (deceleration area AR2: FIG. 5A). When deceleration of the original is started, the first carriage 253 moves by a distance of the deceleration area AR2 of the original in the +y direction and a distance required for acceleration of the first carriage 253 in a minus (−) y direction explained later. The first carriage 253 is stopped, its direction of movement is inverted, and is accelerated to a rate equal to the steady rate (which is the rate required to read the original) (FIG. 5B).

When reaching the steady rate, the first carriage 253 reads the deceleration area AR2 and an acceleration area AR3 of the original (intermission reading: FIG. 5B).

The first carriage 253 performs the intermission reading on the deceleration area AR2 and the acceleration area AR3 of the original, is decelerated to a stop, its direction of movement is inverted, and is stopped at the home position (HP) (FIG. 5B).

Thus, the first carriage 253 performs the intermission reading on the deceleration area AR2 and the acceleration area AR3 of the original which is stopped. When the original feeding is restarted, the first carriage 253 is accelerated to the steady rate and then restarts reading.

Figure 6A:
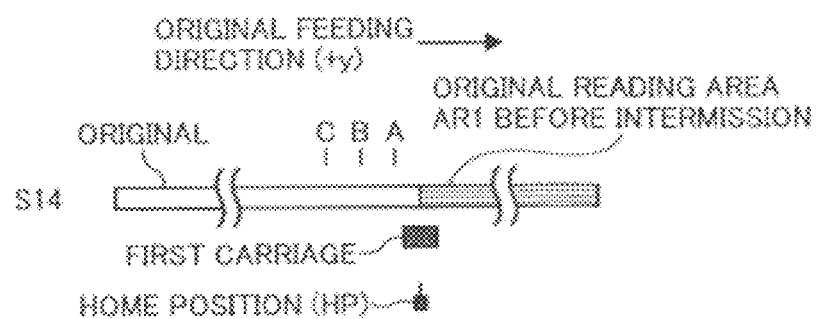
FIGS. 6A to 6N are diagrams for explaining a relationship between movement of the original and movement of the first carriage in the image reading apparatus shown in FIG. 2.
Figure 6B:
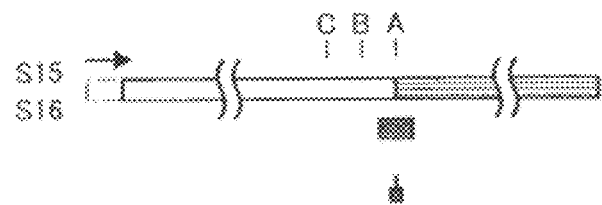
Figure 6C:
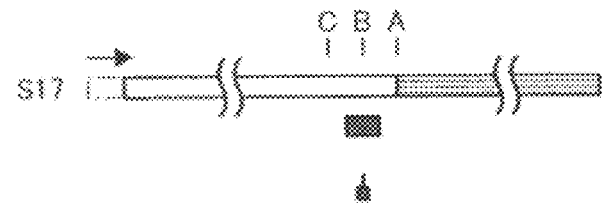
Figure 6D:
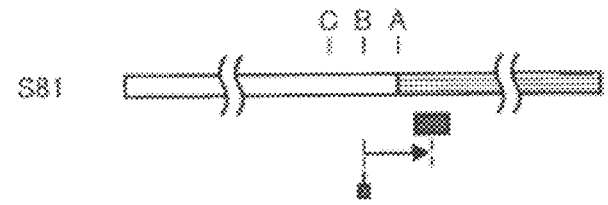
Figure 6E:
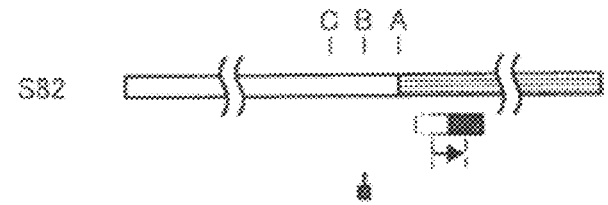
Figure 6F:
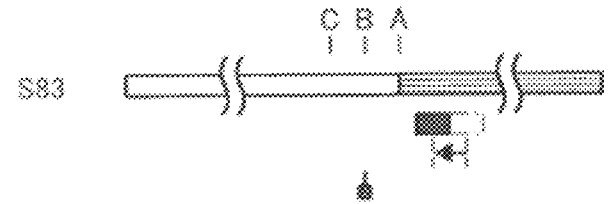
Figure 6G:
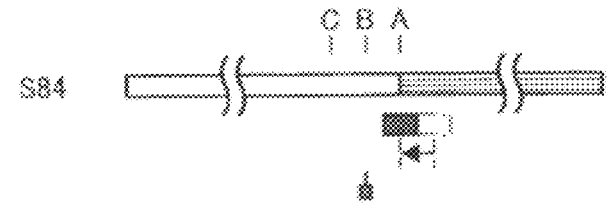
Figure 6H:
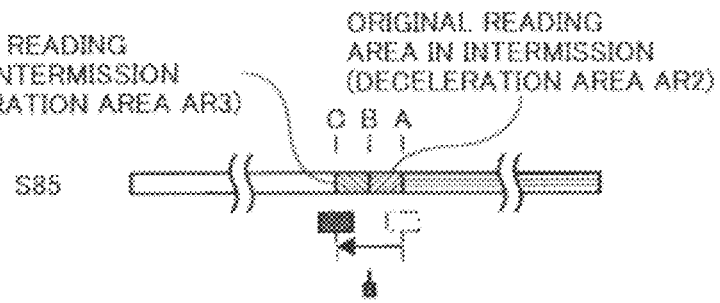
Figure 6I:
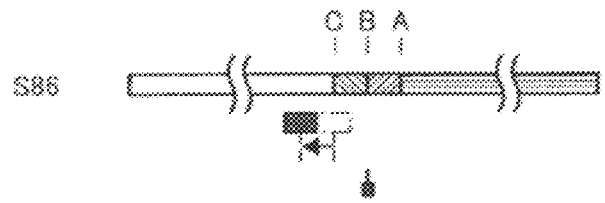
Figure 6J:
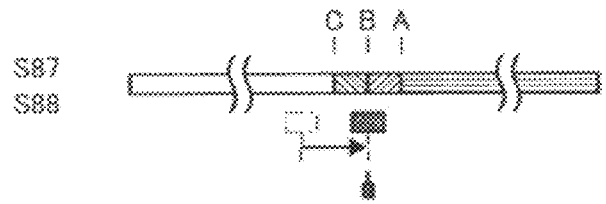
Figure 6K:
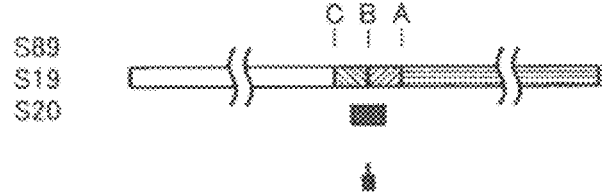
Figure 6L:
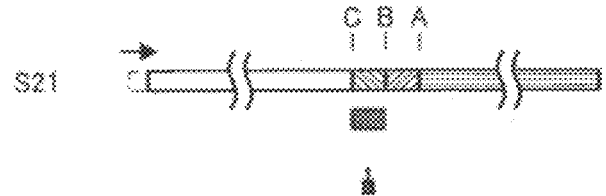
Figure 6M:
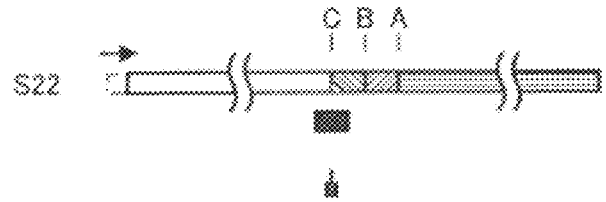
Figure 6N:
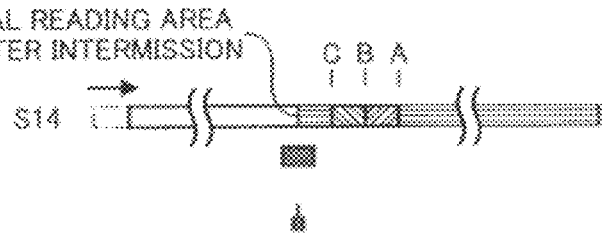

FIGS. 6A to 6N are diagrams for explaining a relationship between movement of the original and movement of the first carriage 253. A letter A represents a position at which interruption of the reading operation is started during the original reading operation or at which the deceleration is started, a letter B represents a position at which the original is decelerated to a stop and feeding of the original is started or at which the acceleration is started, and a letter C represents a position at which the acceleration of the original is stopped to reach the steady rate and reading is restarted. Therefore, an area between the position (A) and the position (B) on the original indicates the deceleration area AR2 of the original, and an area between the position (B) and the position (C) on the original indicates the acceleration area AR3 of the original.

First, FIG. 6A represents a state in which the image reading apparatus normally operates and the first carriage 253 is located at the home position (HP). A solid black area of the original indicates a reading area of the original before intermission occurs.

FIG. 6B represents a state in which the reading and feeding of the original are interrupted due to generation of the memory-full signal in the image reading apparatus. Specifically, when the original is fed from a position indicated by a dotted line to a position indicated by a solid line, the reading of the original is interrupted and the original starts to be decelerated.

FIG. 6C represents a state of the original from starting its deceleration to stopping. Specifically, the original is decelerated from the position indicated by the dotted line to stop at the position indicated by the solid line. Therefore, the original is stopped so that the position (B) coincides with the home position (HP).

FIG. 6D represents a state in which the first carriage 253 is accelerated in the feeding direction (+y direction) of the original.

FIG. 6E represents a state in which the first carriage 253 is decelerated to a stop in the original feeding direction. Specifically, the first carriage 253 starts to be decelerated from the position indicated by the dotted line and is stopped at the position indicated by the solid black area.

FIG. 6F represents a state in which the direction of movement of the first carriage 253 is inverted and starts moving from the position indicated by the dotted line to the position indicated by the solid black area in a direction opposite to the +y direction, or represents a state in which the first carriage 253 is being accelerated.

FIG. 6G represents a state in which the first carriage 253 starts reading the original (intermission reading). Specifically, the first carriage 253 is accelerated from the position indicated by the dotted line and reaches the steady rate required for reading, and then reads the original (intermission reading) from the position (A).

FIG. 6H represents a state in which the first carriage 253 reads the deceleration area AR2 and the acceleration area AR3 of the original. Specifically, the first carriage 253 reads the original while moving at the steady rate in the direction opposite to the original feeding direction from the position indicated by the dotted line to the position indicated by the solid black area (position (A) to position (C) on the original).

FIG. 6I represents a state in which the first carriage 253 is decelerated to a stop in the direction opposite to the original feeding direction. Specifically, the first carriage 253 is decelerated from the position indicated by the dotted line and is stopped at the position indicated by the solid black area.

FIG. 6J represents a state in which the direction of movement of the first carriage 253 is inverted and is returned to the home position (HP). Specifically, the first carriage 253 is accelerated from the position indicated by the dotted line in the original feeding direction, is then decelerated, and is continuously decelerated up to the home position (HP) as the position indicated by the solid black area.

FIG. 6K represents a state in which the first carriage 253 is stopped at the home position (HP).

FIG. 6L represents a state in which the original feeding is restarted. Specifically, the original is accelerated in the original feeding direction from the position indicated by the dotted line to the position indicated by the solid line. Specifically, the original is accelerated when the original moves from the position (B) to the position (C), and then reaches the steady rate.

FIG. 6M represents a state in which the original reaches the position (C). Specifically, the reading of the original is restarted from this position.

FIG. 6N represents a state in which the reading of the original is restarted from the position (C). Specifically, a reading area AR4 of the original after the intermission is read.

Thus, it is understood that areas of the original corresponding to those "before the intermission", "in the intermission", and "after the intermission" are continuously read.

Figure 1:
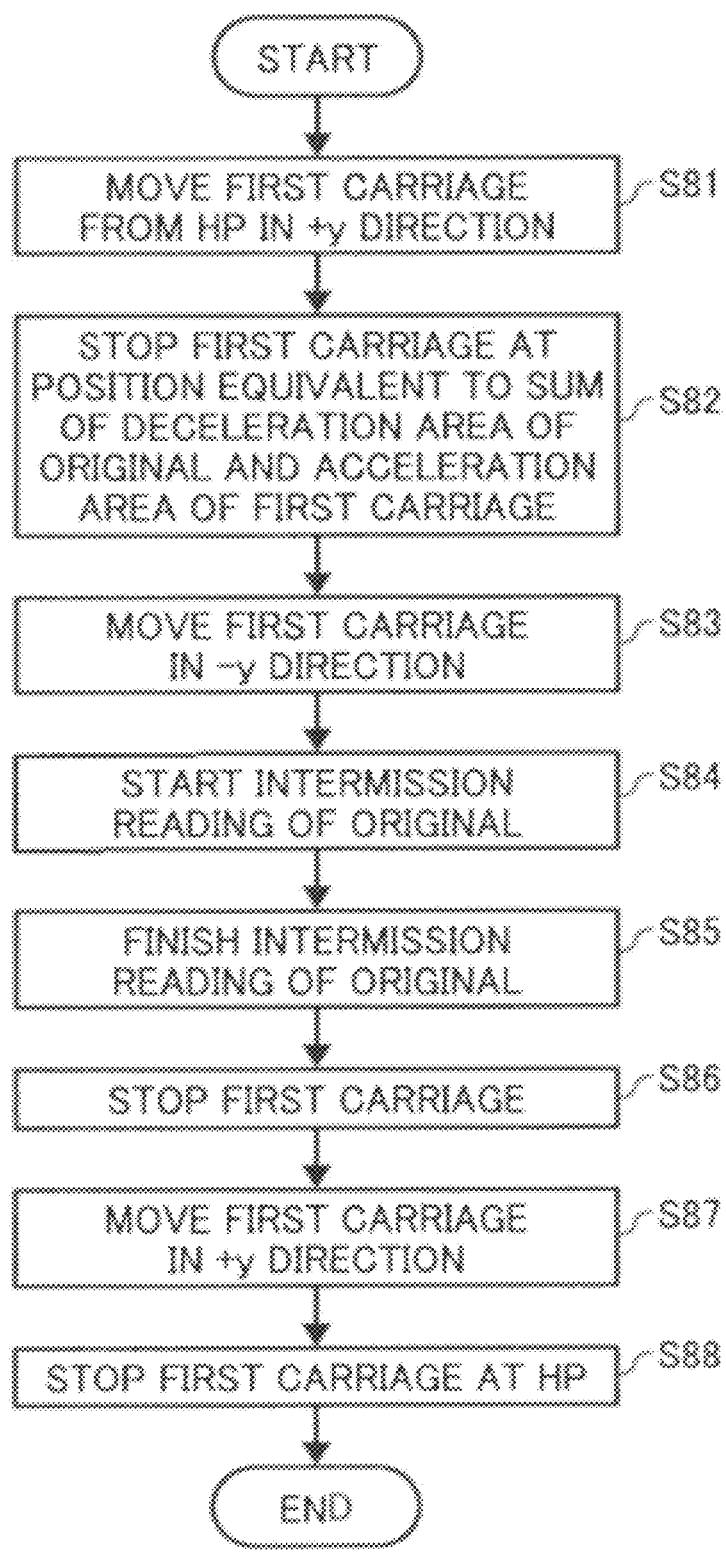
FIG. 1 is a flowchart of details of Step S18 in a flowchart shown in FIG. 7B.
Figure 7A:
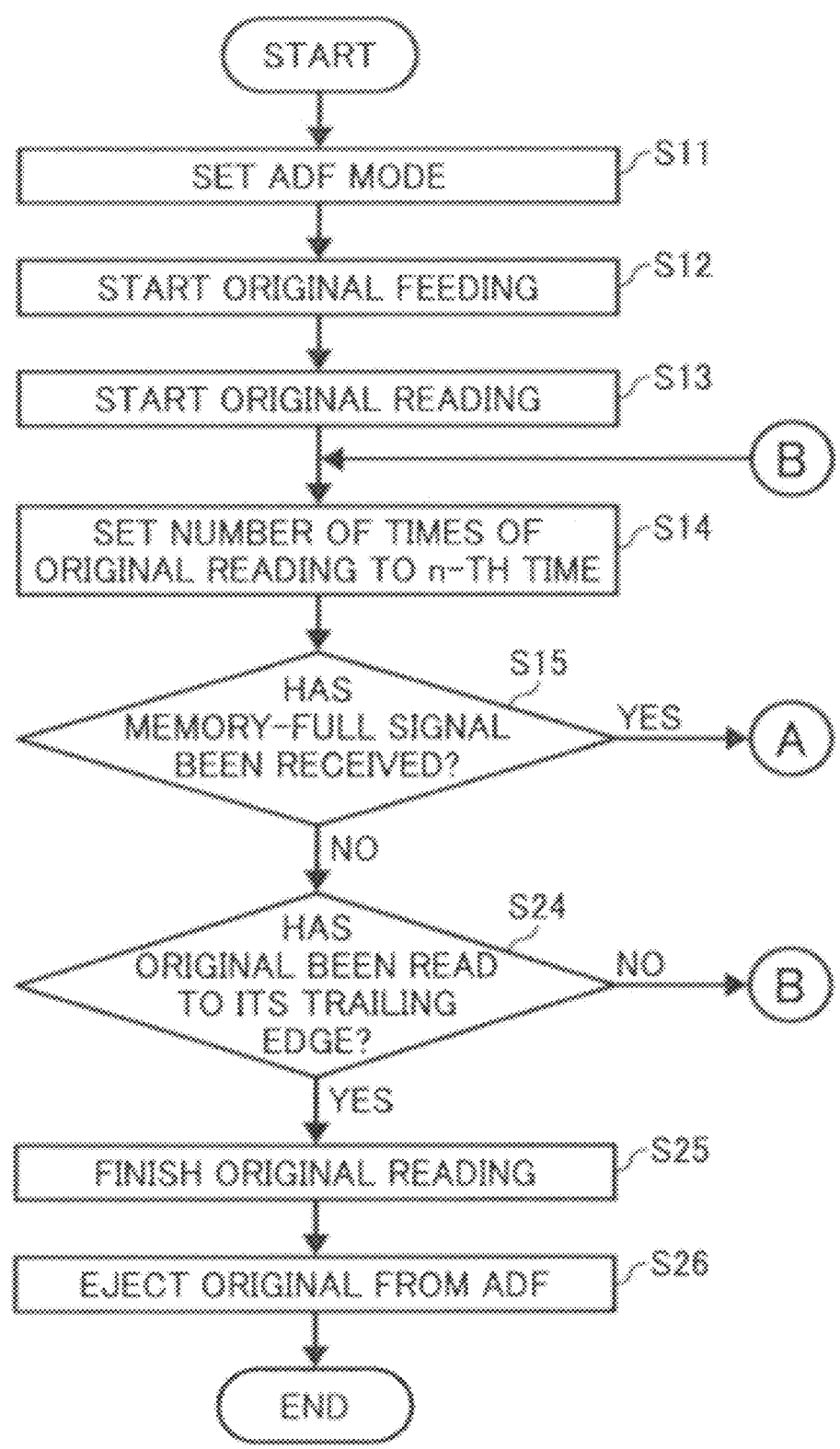

FIGS. 7A and 7B are flowcharts of the whole of an image reading method according to the first embodiment. FIG. 1 is an example of a flowchart showing details of Step S18 in the flowchart in FIG. 17B.

As shown in FIG. 7A, first, a user sets an original on the ADF 230 (see FIG. 2), then, selects an application (such as a copier, a scanner, and a facsimile device), performs other settings (such as image density, read resolution, an image quality mode, and a scaling factor), and lastly, instructs a start of reading the original. In other words, the ADF mode is set (Step S11).

When the ADF mode is set and a start button (not shown) is depressed, the ADF 230 starts the original feeding (Step S12).

After the original feeding is started, an original reading operation is started. Specifically, when the leading edge of the original reaches the reading position of the scanner 210 (FIG. 2), the CPU 261 (FIG. 4) outputs a read start signal to the image input/output processor 265. The read stop signal causes the image input/output processor 265 to start scanning image data (Step S13).

When scanning of the image data is started, the number of times of original reading is set to an n-th time (in this case, n is 1), and the image input/output processor 265 continues to scan the image data. The processed image data is written to the local memory MEM-C 276 (FIG. 4) through the image-storage controller 273 (FIG. 4) (Step S14). When the image data is scanned, the first carriage 253 is located at the home position (HP) (FIG. 6A).

The CPU 261 determines whether the memory-full signal has been received, this signal indicating a factor to interrupt the reading operation in the middle of reading the image data for the original by the ADF 230, and the factor being the reduction in the free space of the local memory MEM-C 276 (Step S15).

When having received, for example, the memory-full signal as the factor to interrupt the reading operation (Yes at Step S15), the CPU 261 gradually increases a generation period of the PWM pulse for controlling the ADF motor 255. The increase in the generation period of the PWM pulse causes the original feed rate to decrease. The CPU 261 outputs the read interrupt signal to the image input/output processor 265. The read interrupt signal causes the image input/output processor 265 to interrupt scanning of the image data (Step S16) (see FIG. 7B). Upon the interruption, the original feed rate is reduced and the position (A) of the original passes the reading position of the first carriage 253 (FIG. 6B).

The CPU 261 stops the PWM pulse for controlling the ADF motor 255. The stop of the PWM pulse causes the original feed rate to decrease and stop (interrupt) (Step S17). When the PWM pulse is stopped, the position (B) of the original is located at the reading position of the first carriage 253 (FIG. 6C).

The original reading operation is started, so that the image data in an area for an intermission portion (deceleration area AR2 and acceleration area AR3), which has not been read during the original feeding by the ADF 230, is read by the first carriage 253 (Step S18).

Here, Step S18 that is a characteristic of the first embodiment is explained below with reference to FIG. 1.

The CPU 261 generates a PWM pulse for controlling the carriage motor 238 so that the first carriage 253 moves in the +y direction (see FIG. 2). The PWM pulse causes the first carriage 253 to move in the +y direction (Step S81).

The CPU 261 stops generating the PWM pulse after the first carriage 253 passes through the position (A) to reach a certain position (not shown). The generation of the PWM pulse is stopped to cause the first carriage 253 to stop (Step S82). At this time, the first carriage 253 is stopped at the side of the steady rate area AR1 of the original or an original reading area AR1 (FIG. 6E).

The CPU 261 generates the PWM pulse for controlling the carriage motor 238 so as to invert the direction of the first carriage 253 to the −y direction. The generated PWM pulse causes the first carriage 253 to move in the −y direction (FIG. 6F, Step S83).

When the first carriage 253 reaches a boundary (position (A) of the original) between the steady rate area AR1 and the deceleration area AR2 of the original, the CPU 261 outputs a signal to start intermission reading to the image input/output processor 265. The signal to start intermission reading causes the intermission reading of the original to be started (FIG. 6G, Step S84).

When the first carriage 253 moves from the position (A) in the −y direction and reaches the position (C), the CPU 261 outputs a signal to finish the intermission reading of the original to the image input/output processor 265. This signal causes the intermission reading of the original to be finished (FIG. 6H, Step S85).

The CPU 261 stops generating the PWM pulse for controlling the carriage motor 238 after the first carriage 253 passes through the position (C) to reach a certain position (not shown). The generation of the PWM pulse is stopped to cause the first carriage 253 to stop (Step S86). At this time, the first carriage 253 is stopped at the side of the original reading area AR4 (FIG. 6I).

The CPU 261 generates a PWM pulse for controlling the carriage motor 238 so as to move the first carriage 253 in the +y direction. The generated PWM pulse causes the first carriage 253 to move in the +y direction (FIG. 6J, Step S87).

When the first carriage 253 reaches the home position (HP), the CPU 261 stops generating the PWM pulse for the carriage motor 238. The stop of the PWM pulse causes the first carriage 253 to stop at the home position (HP) as the reading position and at the position (B) of the original (FIG. 6K, Step S88).

The process at Step S18 is ended when the first carriage 253 returns to the home position (HP), and process proceeds to Step S19 in FIG. 7B, where the first carriage 253 enters standby.

The CPU 261 determines whether, for example, a memory-empty signal as a factor to restart the reading operation has been received, the memory-empty signal indicating that the free space of the local memory MEM-C 276 for storing image data is sufficiently freed up. The first carriage 253 still remains at the position (B) of the original that is stopped (FIG. 6K, Step S20).

It is noted that the positions (A) to (C) on the original move in the +y direction with feeding of the original in the +y direction.

When having received, for example, the memory-empty signal as the factor to restart the reading operation (Yes at Step S20), the CPU 261 restarts the original feeding (Step S21). When the original feeding is restarted, the original passes over the first carriage 253 that is in the standby state at the home position (HP) (FIG. 6L). If the memory-empty signal has not been received (No at Step S20), process returns to Step S19.

The reading of the image data is restarted at a point in time when the position (C) on the original at which the original reading in intermission is stopped reaches the reading position of the first carriage 253 (FIG. 6M). Specifically, after the position (C) of the original passes through the reading position of the first carriage 253, the original reading area (steady rate area) AR4 is read (FIG. 6N, Step S22).

The "n" at Step S23 becomes 2 (=1+1), and process returns to Step S14.

Hereafter, at Step S15, the CPU 261 determines whether the memory-full signal as the factor to interrupt the reading operation has been received.

When it is determined that the memory-full signal has not been received (No at Step S15), then the CPU 261 determines whether the original has been read to its trailing edge (Step S24).

When it is determined that the original has not been read to the trailing edge (No at Step S24), process returns to Step S14. When it is determined that the original has been read to the trailing edge (Yes at Step S24), or when the trailing edge of the original has reached the reading position of the scanner 210, the CPU 261 outputs the read stop signal to the image input/output processor 265. Thus, the image input/output processor 265 stops scanning the image data (Step S25).

The original is ejected from the ADF 230 to the paper ejection tray 248 and the process is ended (Step S26).

As explained above, even if the intermission is repeated, the operations at Steps S14 to S23 allow the reading position of the first carriage 253 to be always located at the home position (HP), so that even if the intermission reading is repeated, image data is not caused to become discontinuous.

Specifically, as shown in FIG. 8, when the intermission occurs (first time), the first carriage 253 is moved along between the feed drum 244 and the glass plate 240 in the +y direction, is inverted to change its direction, performs intermission reading at the steady rate, and is then inverted to change its direction to be returned to the home position (HP). When another intermission occurs (second time), the first carriage 253 is moved in the +y direction, is inverted to change its direction, performs intermission reading, and is then inverted to change its direction, to be returned to the home position (HP). No matter how many intermissions occur (n-th time of intermission), the first carriage 253 performs the same operations and returns to the home position (HP).

It is noted that FIG. 8 is a schematic for explaining a positional relationship between the feed drum and the first carriage of the image reading apparatus shown in FIG. 2.

The first embodiment explains the case where upon the intermission reading as shown in FIGS. 5A and 5B, the carriage is moved in the original feeding direction, is inverted to change its direction, performs the intermission reading while moving in the direction opposite to the original feeding direction, and is then returned to the home position (HP). However, the present invention is not limited to this case, and, therefore, as shown in FIGS. 9A and 9B according to a modification of the first embodiment, upon intermission reading, the carriage may be moved in the direction opposite to the original feeding direction, be inverted to change its direction, perform the intermission reading while moving in the same direction as the original feeding direction, and then be returned to the home position (HP).

FIG. 9A is a diagram for explaining a relationship between a feed rate and a position of the original when the reading operation is interrupted in the middle of the original reading operation and the reading operation is restarted in the image reading apparatus shown in FIG. 2. FIG. 9B is a diagram for explaining how the first carriage moves when the reading operation is interrupted in the middle of the original reading operation and the reading operation is restarted in the image reading apparatus shown in FIG. 2.

Figure 10:
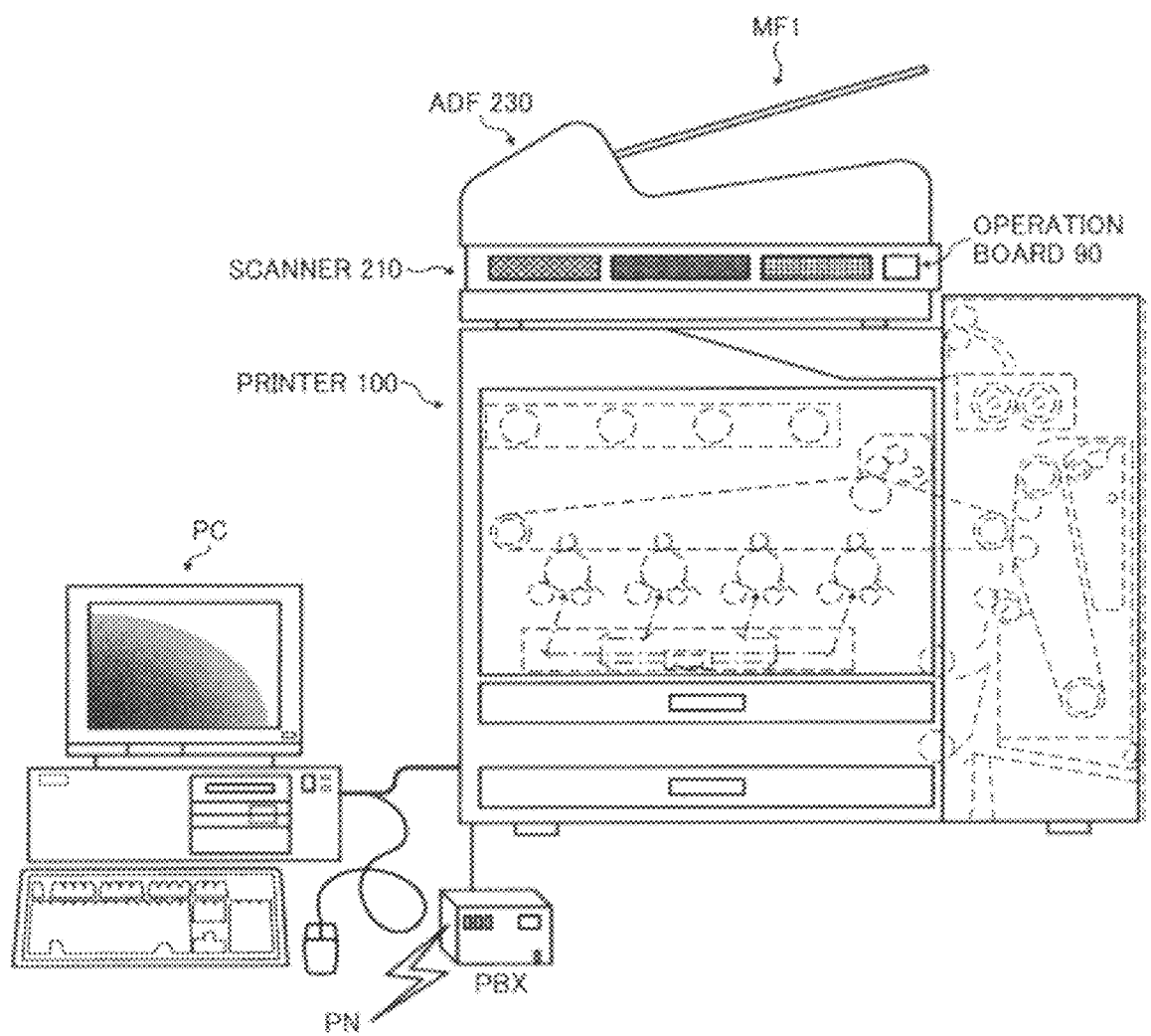
FIG. 10 is a schematic diagram of an image forming apparatus that includes an image reading apparatus according to a second embodiment of the present invention.

FIG. 10 is a conceptual schematic of an image forming apparatus according to a second embodiment of the present invention. The image forming apparatus includes the image reading apparatus according to the first embodiment.

The image forming apparatus as shown in FIG. 10 is a multifunction copy machine MF1 that includes a printer 100, the scanner 210, the ADF 230, and an operation board 90.

The operation board 90 and the scanner 210 with the ADF 230 are units separable from the printer 100. The scanner 210 has a control board that includes a power equipment driver, a sensor input, and a controller. The scanner 210 directly or indirectly communicates with the CPU 261, and can perform original reading at controlled timing.

Connected to the multifunction copy machine MF1 is a local area network (LAN) to which a personal computer PC is connected, and is also a private branch exchange (PBX) that is connected to a telephone line PN (facsimile communication line). A printed sheet of paper in the printer 100 is stored in a paper ejection tray (not shown).

Figure 11:
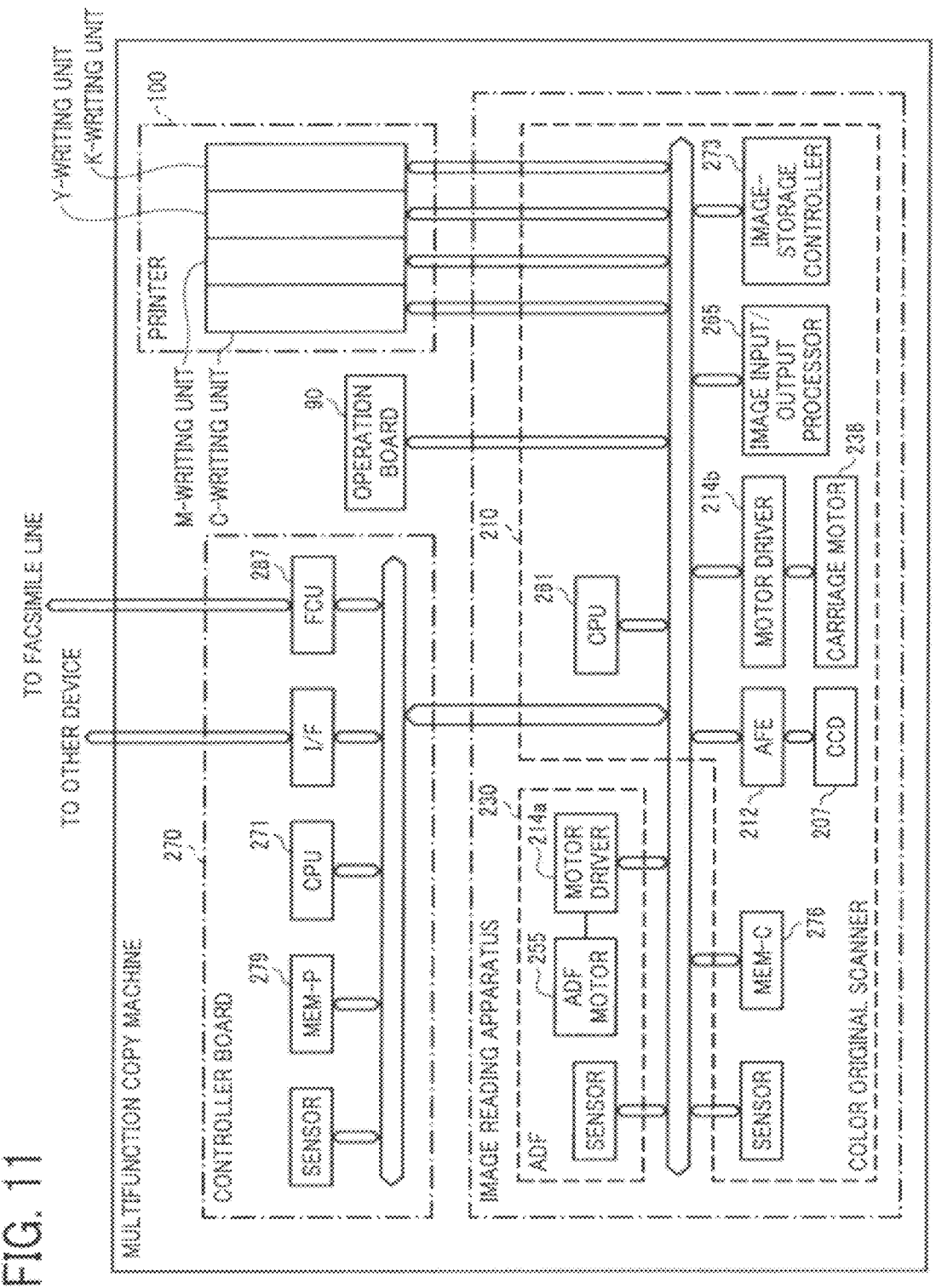
FIG. 11 is a block diagram of the image forming apparatus shown in FIG. 10.
Figure 13D:
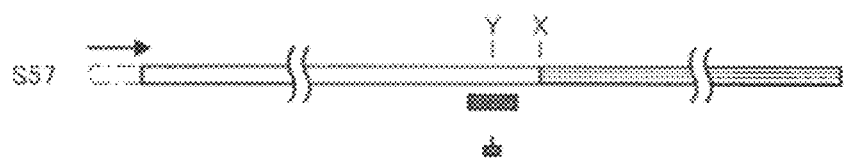
Figure 13E:
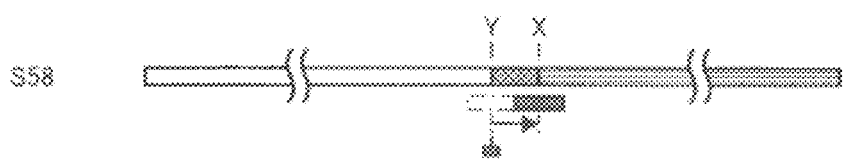
Figure 13F:
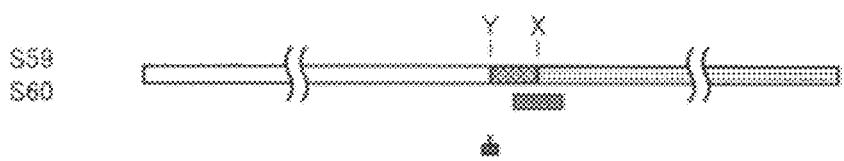
Figure 13G:
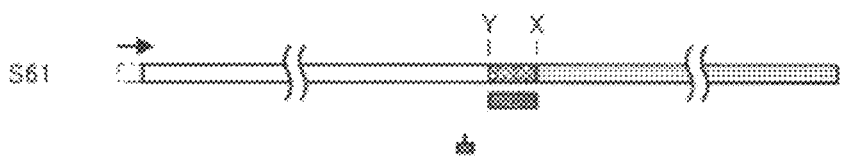
Figure 13H:
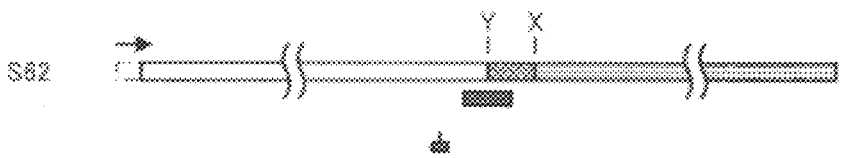
Figure 13I:
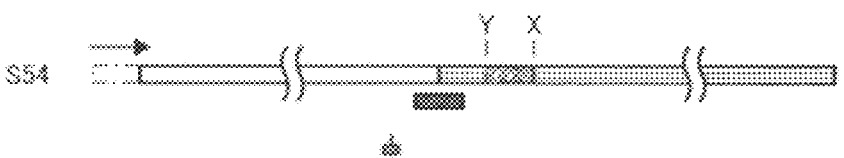
Figure 14A:
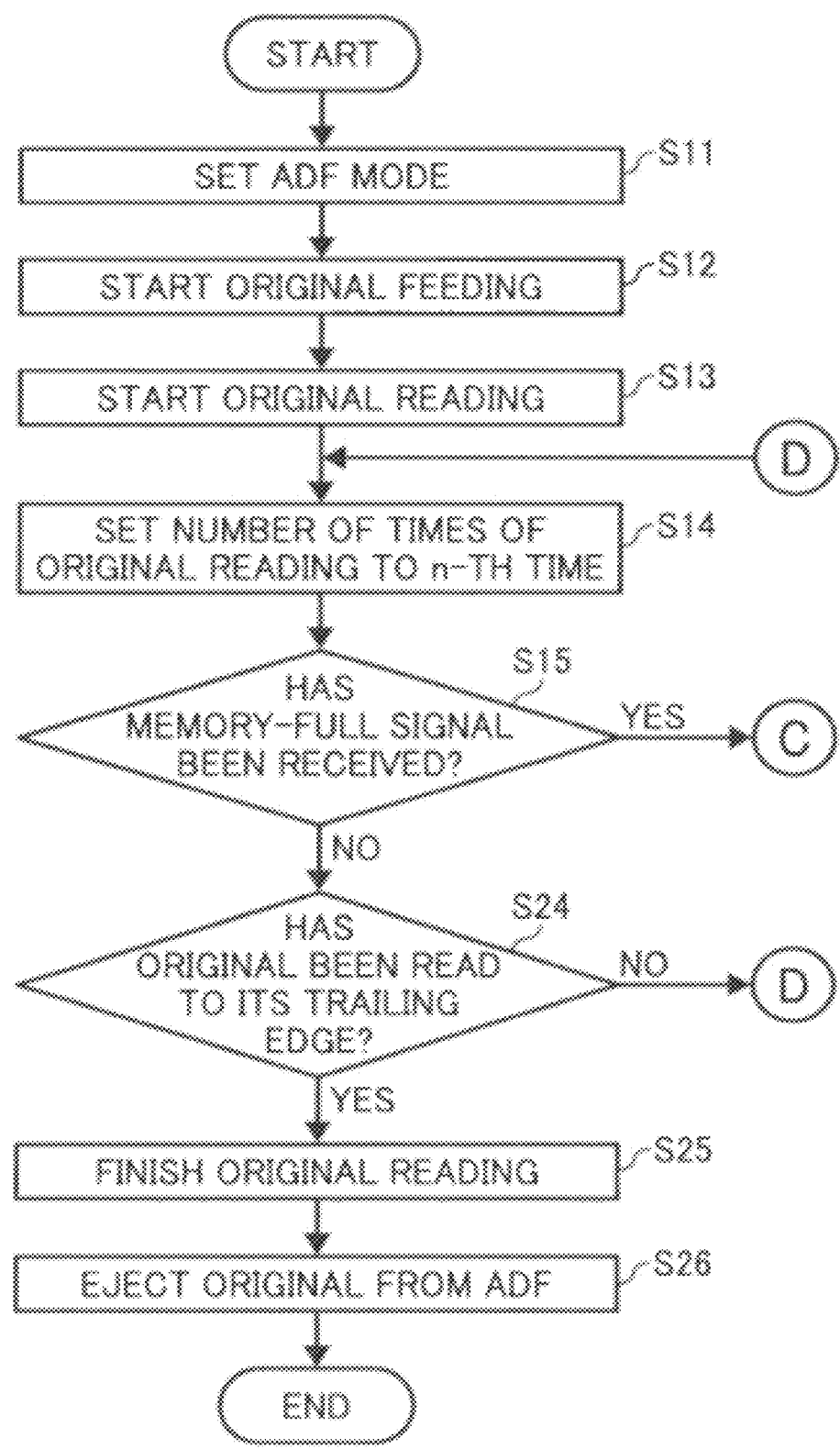
FIG. 14 is a flowchart of how the original is read in the ADF mode in the image reading apparatus shown in FIG. 12.
Figure 14B:
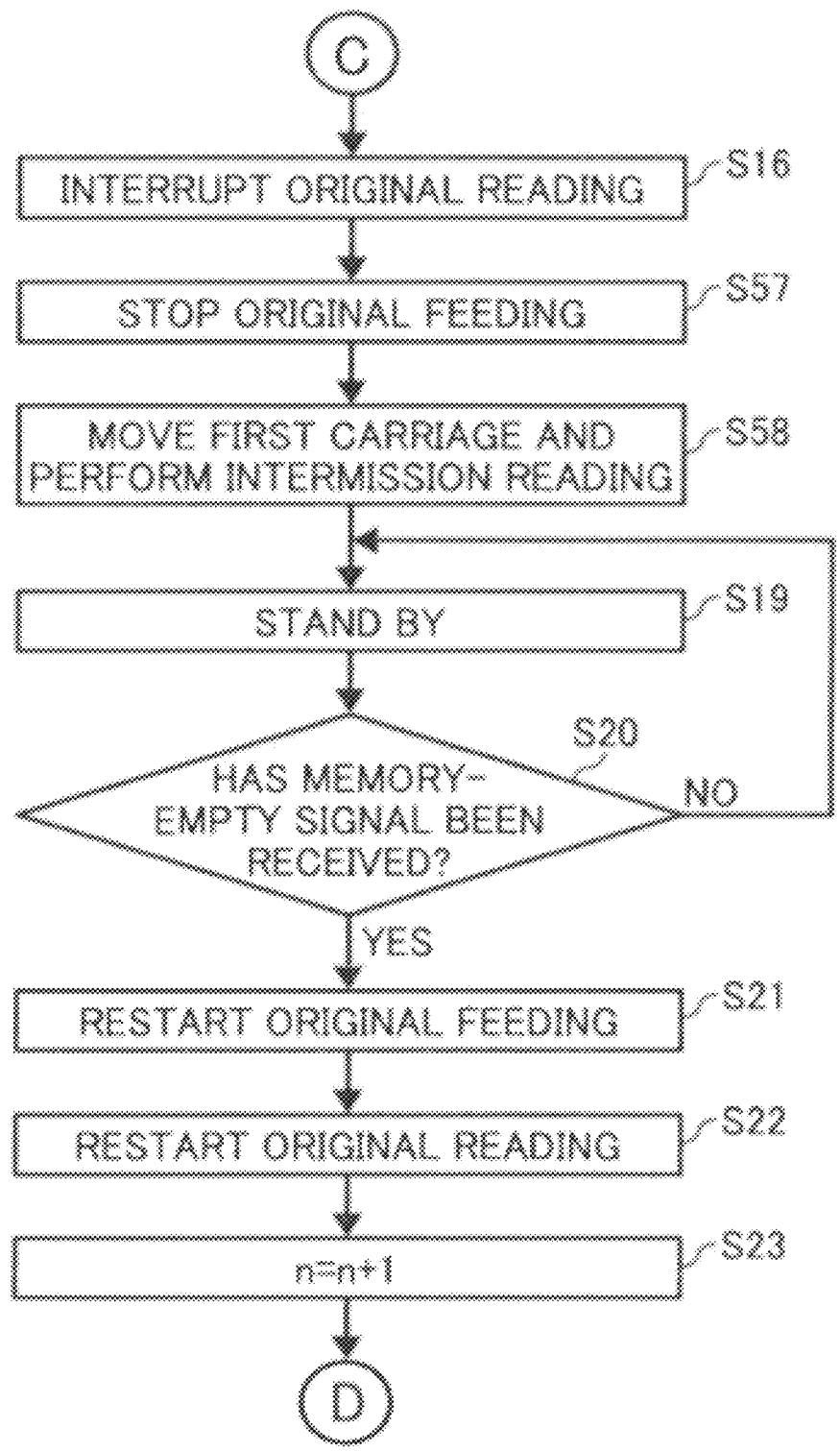
Figure 16A:
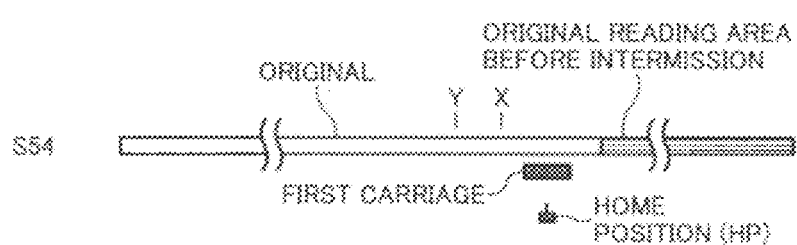
FIGS. 16A to 16I are diagrams for explaining a positional relationship between the original and the first carriage in the image reading apparatus according to the present invention.
Figure 16B:
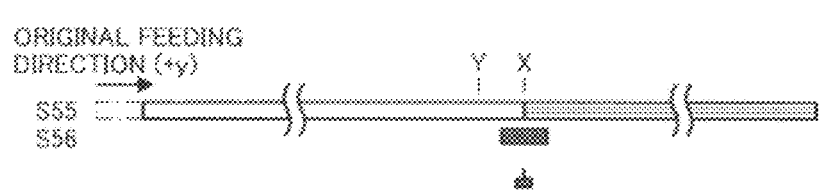
Figure 16C:
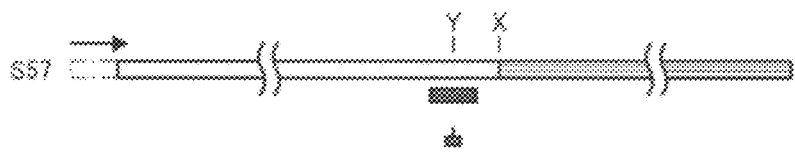
Figure 16D:
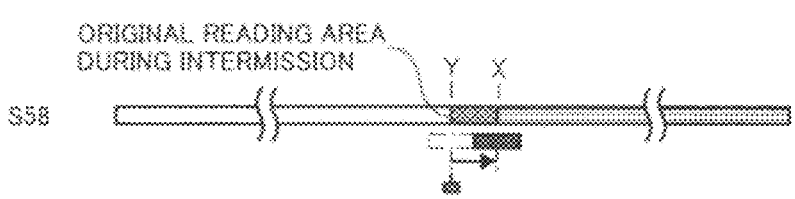
Figure 16E:
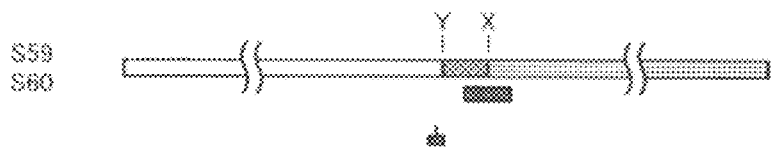
Figure 16F:
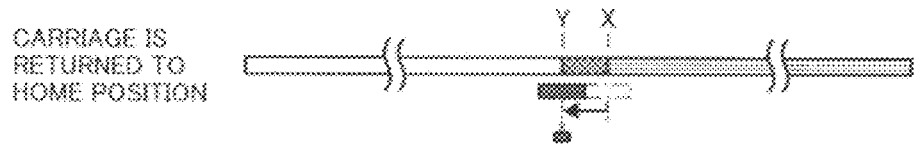
Figure 16G:
Figure 16H:
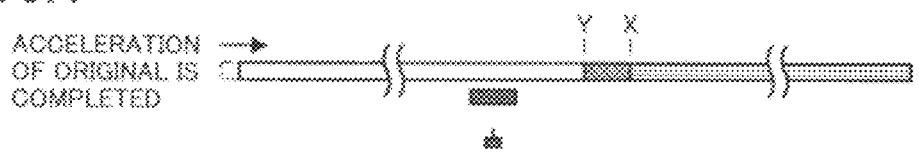
Figure 16I:
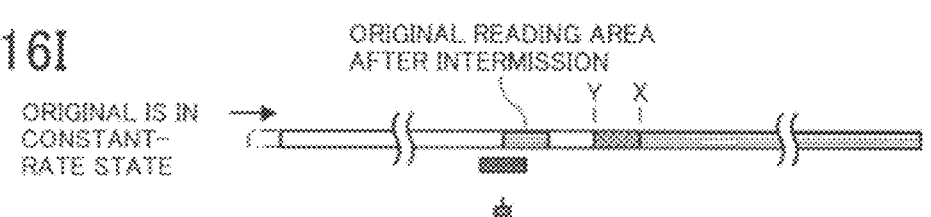

FIG. 11 is a block diagram of the image forming apparatus shown in FIG. 10.

The image forming apparatus shown in FIG. 11 includes the image reading apparatus, the operation board 90, the printer 100, and a controller board 270.

The printer 100 is a color printer including a cyan (C)-writing unit, a magenta (M)-writing unit, a yellow (Y)-writing unit, and a black (k)-writing unit.

The operation board 90 includes a power switch, a "copy" button, a "number of copies" button, a "print-size specification" button, a "zoom" button, a "duplex-copy selection" button, and a display portion.

The controller board 270 includes a CPU 271, a system memory MEM-P 279, a facsimile communication unit (FCU) 287, a ROM that stores a control program, and an interface (I/F) such as a network interface card (NIC), a universal serial bus (USB) device, the Institute of Electrical and Electronics Engineers (IEEE) 1394 device, and a Centronics™ device.

The image forming apparatus configured in the above manner can also obtain the same effect as that of the image forming apparatus according to the first embodiment.

The image reading apparatus according to the present invention as explained above is implemented by a program that causes a computer to execute processes. The computer includes, for example, a personal computer and a general-purpose computation such as a work station; however, the present invention is not limited thereto.

According to still another embodiment, a computer program product includes a computer program stored on a computer-readable recording medium. The computer program when executed on a computer causes the computer to execute scanning one line of an original in a main scanning direction by a scanning unit to collect a reflected light; converting the reflected light to image data by a photoelectric converter; temporarily storing the image data in a storage unit; moving the original at a predetermined rate in a sub-scanning direction perpendicular to the main scanning direction by an original moving unit; moving the scanning unit in parallel to the sub-scanning direction by a scanner moving unit; and controlling operations of the scanning unit, the photoelectric converter, the storage unit, the original moving unit, and the scanner moving unit. The controlling includes, when scanning of the original is to be interrupted because of running out memory space for image data in the storage unit, controlling the original moving unit to decelerate the original and then stop the original, the scanner moving unit to move the scanning unit by a sum of a distance from decelerating the original to stopping from a standby position in the sub-scanning direction and an acceleration distance in which the original is accelerated to a read rate, and then controlling the scanning unit to scan the original while the scanner moving unit is moving the scanning unit in a direction opposite to the sub-scanning direction at a rate required for reading, and the scanner moving unit to return the scanning unit to the standby position after scanning of the original is finished, the controlling includes, when scanning of the original is to be restarted when memory space for image data becomes available in the storage unit, controlling the original moving unit to accelerate the original to the rate required for reading and controls the scanner moving unit to move the scanning unit to scan the original.

According to the above configuration, when the reading is interrupted, the scanning unit and the feeding unit are stopped, the reading position of the scanning unit is moved from the home position in the sub-scanning direction by a sum of a deceleration distance of the feeding unit and an acceleration distance in which the moving unit is accelerated to the rate equivalent to that of the feeding unit and is stopped, then, the original for a predetermined area including the portion for the acceleration distance is read at the feed rate while the reading position of the scanning unit is moved in the direction opposite to the sub-scanning direction, and the reading position of the scanning unit is moved in the sub-scanning direction after the reading is finished, to be returned to the home position. When the reading is restarted, the feeding unit is activated to start reading the original. Therefore, not only the deceleration distance upon feeding of the original but also the portion for the acceleration distance are previously read, and the moving unit moves the reading position of the scanning unit to the home position. Consequently, even if the intermission reading is repeated, image data is prevented from being discontinuous and the scanning unit is also prevented from displacement from the home position.

Thus, the image reading apparatus and the image forming apparatus according to the present invention can be implemented in any situation if there is a computing environment that allows a computer to execute the program.

The program may be stored in a computer-readable recording medium.

The recording medium includes a computer-readable recording medium such as a compact disk read only memory (CD-ROM), a flexible disk (FD), a compact disk recordable (CD-R), and a digital versatile disk (DVD); a semiconductor memory such as a flash memory, a RAM, a ROM, and a ferroelectric random access memory (FeRAM); and a hard disk drive (HDD).

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a scanning unit that scans one line of an original in a main scanning direction to collect a reflected light;
a photoelectric converter that converts the reflected light collected at the scanning unit to image data;
a storage unit that temporarily stores therein the image data;
an original moving unit that moves the original at a predetermined rate in a sub-scanning direction perpendicular to the main scanning direction;
a scanner moving unit that moves the scanning unit in parallel to the sub-scanning direction; and
a control unit that controls operations of the scanning unit, the photoelectric converter, the storage unit, the original moving unit, and the scanner moving unit, wherein
the control unit, when scanning of the original is to be interrupted because of running out memory space for image data in the storage unit, controls
the original moving unit to decelerate the original and then stop the original,
the scanner moving unit to move the scanning unit by a sum of a distance from decelerating the original to stopping from a standby position in the sub-scanning direction and an acceleration distance in which the original is accelerated to a read rate, and then controls the scanning unit to scan the original while the scanner moving unit is moving the scanning unit in a direction opposite to the sub-scanning direction at a rate required for reading, and
the scanner moving unit to return the scanning unit to the standby position after scanning of the original is finished,
the control unit, when scanning of the original is to be restarted when memory space for image data becomes available in the storage unit, controls the original moving unit to accelerate the original to the rate required for reading and controls the scanner moving unit to move the scanning unit to scan the original.

2. The image reading apparatus according to claim 1, wherein the scanner moving unit includes
a plurality of pulleys that are driven to rotate by a motor arranged near a path of the scanning unit;
a looped wire that is wrapped around each of the pulleys and fixes the scanning unit;
a plurality of rails arranged along paths; and
a plurality of moving pulleys that are provided in a reflecting unit including a mirror that bends and guides the reflected light from the scanning unit to the photoelectric converter, around which the wire is wrapped, and that move the reflecting unit along the rails at a rate of nearly a half of that of the scanning unit.

3. The image reading apparatus according to claim 1, wherein the feeding unit includes
a feed drum that is arranged so that the reflected light from the original is irradiated to the scanning unit, and is driven to rotate by another motor;
a plurality of pressing rollers that are arranged around the feed drum and press the original against the feed drum;
a pickup roller that is driven to rotate by another further motor to insert the original placed on an original tray into between the feed drum and the pressing rollers; and
a paper ejection roller that ejects read original from the feed drum to a paper ejection tray.

4. An image forming apparatus that uses the image reading apparatus according to claim 1.

5. An image reading method comprising:
scanning one line of an original in a main scanning direction by a scanning unit to collect reflected light;
converting the reflected light to image data by a photoelectric converter;
temporarily storing the image data in a storage unit;
moving the original at a predetermined rate in a sub-scanning direction perpendicular to the main scanning direction by an original moving unit;
moving the scanning unit in parallel to the sub-scanning direction by a scanner moving unit; and
controlling operations of the scanning unit, the photoelectric converter, the storage unit, the original moving unit, and the scanner moving unit, wherein
the controlling includes, when scanning of the original is to be interrupted because of running out memory space for image data in the storage unit, controlling
the original moving unit to decelerate the original and then stop the original,
the scanner moving unit to move the scanning unit by a sum of a distance from decelerating the original to stopping from a standby position in the sub-scanning direction and an acceleration distance in which the original is accelerated to a read rate, and then controlling the scanning unit to scan the original while the scanner moving unit is moving the scanning unit in a direction opposite to the sub-scanning direction at a rate required for reading, and
the scanner moving unit to return the scanning unit to the standby position after scanning of the original is finished,
the controlling includes, when scanning of the original is to be restarted when memory space for image data becomes available in the storage unit, controlling the original moving unit to accelerate the original to the rate required for reading and controls the scanner moving unit to move the scanning unit to scan the original.

6. The image reading method according to claim 5, wherein the scanning moving unit includes
a plurality of pulleys that are driven to rotate by a motor arranged near a path of the scanning unit;
a looped wire that is wrapped around each of the pulleys and fixes the scanning unit;
a plurality of rails arranged along paths; and
a plurality of moving pulleys that are provided in a reflecting unit including a mirror that bends and guides the reflected light from the scanning unit to the photoelectric converter, around which the wire is wrapped, and that move the reflecting unit along the rails at a rate of nearly a half of that of the scanning unit.

7. The image reading method according to claim 5, wherein the feeding unit includes
   a feed drum that is arranged so that the reflected light from the original is irradiated to the scanning unit, and is driven to rotate by another motor;
   a plurality of pressing rollers that are arranged around the feed drum and press the original against the feed drum;
   a pickup roller that is driven to rotate by another further motor to insert the original placed on an original tray into between the feed drum and the pressing rollers; and
   a paper ejection roller that ejects read original from the feed drum to a paper ejection tray.

8. An image forming method that uses the image reading method according to claim 5.

9. A non-transitory computer readable medium encoded with computer executable instructions performing the steps of:
   scanning one line of an original in a main scanning direction by a scanning unit to collect reflected light;
   converting the reflected light to image data by a photoelectric converter;
   temporarily storing the image data in a storage unit;
   moving the original at a predetermined rate in a sub-scanning direction perpendicular to the main scanning direction by an original moving unit;
   moving the scanning unit in parallel to the sub-scanning direction by a scanner moving unit; and
   controlling operations of the scanning unit, the photoelectric converter, the storage unit, the original moving unit, and the scanner moving unit, wherein
   the controlling includes, when scanning of the original is to be interrupted because of running out memory space for image data in the storage unit, controlling
      the original moving unit to decelerate the original and then stop the original,
      the scanner moving unit to move the scanning unit by a sum of a distance from decelerating the original to stopping from a standby position in the sub-scanning direction and an acceleration distance in which the original is accelerated to a read rate, and then controlling the scanning unit to scan the original while the scanner moving unit is moving the scanning unit in a direction opposite to the sub-scanning direction at a rate required for reading, and
      the scanner moving unit to return the scanning unit to the standby position after scanning of the original is finished,
   the controlling includes, when scanning of the original is to be restarted when memory space for image data becomes available in the storage unit, controlling the original moving unit to accelerate the original to the rate required for reading and controls the scanner moving unit to move the scanning unit to scan the original.

10. The non-transitory computer readable medium according to claim 9, wherein the scanning moving unit includes
   a plurality of pulleys that are driven to rotate by a motor arranged near a path of the scanning unit;
   a looped wire that is wrapped around each of the pulleys and fixes the scanning unit;
   a plurality of rails arranged along paths; and
   a plurality of moving pulleys that are provided in a reflecting unit including a mirror that bends and guides the reflected light from the scanning unit to the photoelectric converter, around which the wire is wrapped, and that move the reflecting unit along the rails at a rate of nearly a half of that of the scanning unit.

11. The non-transitory computer readable medium according to claim 9, wherein the feeding unit includes
   a feed drum that is arranged so that the reflected light from the original is irradiated to the scanning unit, and is driven to rotate by another motor;
   a plurality of pressing rollers that are arranged around the feed drum and press the original against the feed drum;
   a pickup roller that is driven to rotate by another further motor to insert the original placed on an original tray into between the feed drum and the pressing rollers; and
   a paper ejection roller that ejects read original from the feed drum to a paper ejection tray.

12. An image forming method that uses the non-transitory computer readable medium according to claim 9.

* * * * *